United States Patent
Raghuvanshi et al.

(10) Patent No.: US 11,197,087 B2
(45) Date of Patent: Dec. 7, 2021

(54) FREQUENCY ASSIGNMENTS FOR WIRELESS MICROPHONE SYSTEMS

(71) Applicant: HARMAN INTERNATIONAL INDUSTRIES, INCORPORATED, Stamford, CT (US)

(72) Inventors: Praveen Raghuvanshi, Bangalore (IN); Manoj Sakhare, Pune (IN)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 16/365,578

(22) Filed: Mar. 26, 2019

(65) Prior Publication Data

US 2019/0306614 A1 Oct. 3, 2019

(30) Foreign Application Priority Data

Mar. 27, 2018 (IN) .............................. 201841011304

(51) Int. Cl.
| | |
|---|---|
| *H04R 1/22* | (2006.01) |
| *H04R 1/04* | (2006.01) |
| *H04W 4/70* | (2018.01) |
| *H04W 4/50* | (2018.01) |

(52) U.S. Cl.
CPC .............. *H04R 1/222* (2013.01); *H04R 1/04* (2013.01); *H04W 4/50* (2018.02); *H04W 4/70* (2018.02)

(58) Field of Classification Search
CPC combination set(s) only.
See application file for complete search history.

(56) References Cited

U.S. PATENT DOCUMENTS

| 4,596,041 A * | 6/1986 | Mack ................ H04M 3/42221 340/870.11 |
|---|---|---|
| 8,497,940 B2 * | 7/2013 | Green ...................... H04B 1/04 348/485 |
| 9,094,753 B2 * | 7/2015 | Kung ....................... H04R 1/04 |

(Continued)

FOREIGN PATENT DOCUMENTS

JP 60109995 A * 6/1985 ............. H04R 1/403

OTHER PUBLICATIONS

Extended European search Report for application No. 19165058.9 dated Jul. 4, 2019.

*Primary Examiner* — Oyesola C Ojo
(74) *Attorney, Agent, or Firm* — Artegis Law Group, LLP

(57) ABSTRACT

A system and method for determining assigned frequencies for wireless microphone systems (WMSs) at a venue. Each WMS comprises a transmitter and a receiver. Each transmitter may comprise an IoT device connected to the transmitters and a server via a network. A first input for requesting the assigned frequencies is received at a transmitter which sends the request to the server via the network. The server determines intermodulation free frequencies based on chained stages and predefined data describing the WMSs at the venue and transmits the intermodulation free frequencies to one or more transmitters at the venue. Each WMS receives an intermodulation free frequency as an assigned frequency. A second input for requesting validation of an assigned frequency is received at a transmitter which sends the request to the server. The server determines and sends a validation status of the assigned frequency to the transmitter which displays the validation status.

20 Claims, 14 Drawing Sheets

(56) References Cited

U.S. PATENT DOCUMENTS

| | | | |
|---|---|---|---|
| 9,615,175 B2* | 4/2017 | Georgi | H04R 3/12 |
| 2010/0226100 A1* | 9/2010 | Johnson | G06F 1/181 |
| | | | 361/730 |
| 2011/0255708 A1* | 10/2011 | Crowley | H01Q 7/00 |
| | | | 381/77 |
| 2012/0052827 A1* | 3/2012 | Sadek | H04B 7/0808 |
| | | | 455/226.1 |
| 2012/0106751 A1* | 5/2012 | Li | H04R 3/005 |
| | | | 381/77 |
| 2013/0101134 A1* | 4/2013 | Betts-Lacroix | H04S 7/30 |
| | | | 381/80 |
| 2014/0119562 A1* | 5/2014 | Georgi | H04R 3/12 |
| | | | 381/81 |
| 2014/0241559 A1* | 8/2014 | Mulder | H04R 3/02 |
| | | | 381/355 |
| 2014/0254810 A1* | 9/2014 | Abramsky | H04B 5/06 |
| | | | 381/58 |
| 2016/0316422 A1* | 10/2016 | Regan | H04W 24/02 |
| 2017/0063999 A1* | 3/2017 | Adrangi | H04W 4/70 |
| 2019/0268683 A1* | 8/2019 | Miyahara | H04R 1/04 |

\* cited by examiner

| Combination | Parameters of Device | Stages |
|---|---|---|
| Device 1 | Device 1 | S1 → S2 → S3 → S4 → S5 |
| Device 1 + Device 2 | Device 1 | S1 → S2 → S3 → S4 → S5 |
| Device 1 + Device 3 | Device 1 | S1 → S2 → S3 → S4 → S5 |
| Device 2 + Device 3 | Device 2 | S1 → S2 → S3 → S4 → S5 |
| Device 1 + Device 2 + Device 3 | Device 1 | S1 → S2 → S3 → S4 → S5 |

FIG.5

| Combination | Stages |
|---|---|
| Device 1 |  |
| Device 1 + Device 2:<br>For Device 1 stages won't change, but for Device 2, the stages are chained as shown to get more precise frequency setup |  |
| Device 1 + Device 3 |  |
| Device 2 + Device 3 |  |
| Device 1 + Device 2 + Device 3 |  |

# FREQUENCY ASSIGNMENTS FOR WIRELESS MICROPHONE SYSTEMS

CROSS-REFERENCE TO RELATED APPLICATIONS

This application claims the priority of Indian Provisional Patent Application titled, "METHOD AND SYSTEM FOR VALIDATING FREQUENCY ASSIGNMENT IN WIRELESS MICROPHONE SYSTEM," filed on Mar. 27, 2018, and having Serial No. 201841011304. The subject matter of this related application is hereby incorporated herein by reference.

BACKGROUND

Field of the Embodiments

The present disclosure relates to a wireless microphone system, and more particularly relates to determining an assigned frequency and validating the assigned frequency for the wireless microphone system.

Description of the Related Art

A Wireless Microphone System (WMS) is a vital product in the professional audio domain. A typical audio WMS setup may include a minimum 10-12 WMSs, each WMS comprising a pairing of a transmitter and a receiver configured to operate using an assigned frequency. Each transmitter (microphone) sends audio data in a modulated form to a paired receiver via a dedicated channel (assigned frequency). The receiver receives and demodulates the modulated signal and forwards the demodulated signal further down the audio chain, for example, to a mixer. Every transmitter and receiver pairing must have a unique synchronized or assigned frequency. A WMS that is not correctly frequency configured may experience intermodulation products/problems, such as noise, impulses, and disturbances in the audio reception at the receiver end. Hence, avoiding radio frequency (RF) interference caused by intermodulation products is a critical issue for a WMS setup.

The frequency assignment with respect to each WMS in a WMS setup is not simple and involves complex radio frequency (RF) engineering to achieve an intermodulation-free RF environment. For example, a WMS setup at a particular venue for a performance may include a set of 20-30 WMSs, each WMS comprising a pairing of a transmitter and a receiver. For each WMS, an assigned frequency must be determined that avoids intermodulation products (RF interference) across the entire WMS setup. Conventionally, frequency assignments for the WMSs are determined by sound engineers who manually perform intermodulation calculations to determine a set of assigned frequencies for the set of WMSs at a particular venue. Such conventional techniques are time consuming and inefficient. Further, once the performance (e.g., music concert or speaking engagement) begins, conventional techniques cannot easily address intermodulation problems that may occur at one or more WMSs during the performance. In such situations, a sound engineer must manually evaluate intermodulation problems caused by the assigned frequencies and manually re-assign a new set of assigned frequencies for the set of WMSs if needed. Thus, frequency assignment for each WMS is typically static/stable and the WMS cannot dynamically adapt to intermodulation problems that may occur during the performance.

Hence, there is a need for an improved method and system for determining and validating assigned frequencies for a plurality of WMSs at a venue.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the present disclosure to provide an improved method and system which is capable of validating frequency assignment in a wireless microphone system and dynamically generating a precise set of intermodulation free frequencies.

It is another aspect of the present disclosure to provide an improved method and system which is capable of enabling Internetworking in the wireless microphone system for validating the assigned frequencies.

It is further aspect of the present disclosure to provide an improved method and system which is capable of determining robustness of the frequency setup for the wireless microphone system using a chained stage calculation process and providing information regarding stability of audio quality for the wireless microphone system.

It is yet another aspect of the present disclosure to provide an improved method and system which is capable of sharing a backup frequency between microphone devices and validating the shared frequency.

In one aspect of the present disclosure, a method for validating frequency assigned to a wireless microphone system is disclosed. A request from a user for validating a frequency assigned to the wireless microphone system having a plurality of transmitters and receivers is received and the assigned frequencies is transferred to a server via a smart controller module configured on the transmitters. A frequency array is prepared based on a predefined data stored in the server and an intermodulation calculation is performed for each set of frequencies in the frequency array. A robust index is assigned for each intermodulation free frequency from the frequency array and the calculation stage is changed in a chained manner to generate a set of intermodulation free frequencies. The robustness of the intermodulation free frequency decreases with each change in the calculation stage. A validation status is generated for the assigned frequency based on the intermodulation free frequencies and the validation status is interpreted from the server to provide a visual indication regarding the assigned frequency on a user interface of the transmitters.

The predefined data stored in the server includes a hardware based distance parameter, a user input data, and entire frequency set up data, a third party frequency data and an environment data. The assigned frequency is determined as valid if the frequency lies within the set of intermodulation free frequencies. The assigned frequency is determined as invalid if the frequency cause intermodulation. The calculation stages are shifted in a daisy chained manner for each combination of the transmitters in the wireless microphone system. An auxiliary frequency from the intermodulation free frequencies is stored as a backup frequency on the transmitters and the backup frequency is shared with other transmitters upon receiving a request from the user for frequency sharing. The robustness of the frequency assigned to the wireless microphone system is determined using the robustness index. The robustness index is indexed as: Index 1: Best, Index 2: Robust, Index 3: Standard, Index 4: More, Index 5: Maximum.

In another aspect of the present disclosure, a system for validating frequency assigned to the wireless microphone system is disclosed which includes a plurality of transmitters to transmit a modulated audio signal over a radio frequency from a predefined band via a radio frequency antenna and a smart controller module. A plurality of wireless receivers operable to wirelessly receive modulated audio signal from the transmitters and processes the signal and provides an audio signal output via the radio frequency antenna. A server configured with a validation module is connected to the transmitters via the smart controller module. The validation module includes an input module to receive a request from a user for validating a frequency assigned to the wireless microphone system and transfer the assigned frequencies to the server via the smart controller module.

An intermodulation calculation module prepares a frequency array based on a predefined data stored in the server and performs an intermodulation calculation for each set of frequencies in the frequency array. A state changer module assigns a robust index for each intermodulation free frequency from the frequency array and changes the calculation stage in a chained manner to generate a set of intermodulation free frequencies. A result management module generates a validation status for the assigned frequency based on the intermodulation free frequencies and interprets the validation status from the server to provide a visual indication regarding the assigned frequency on a user interface of the transmitters. The validation module further includes a frequency assignment module to assign frequencies to the wireless microphone system based on a frequency band and requirement.

The server comprises a local server that is connected to the transmitters via a wireless Local Area Network or instance on cloud. The smart controller module comprises an Internet of Things (IoT) module or a Bot module. The server is connected to the transmitters via the Internet of Things (IoT) module or the Bot module. The transmitters further include a user interface having a validation button that is pressed by a user to validate the assigned frequency and a display to display the validation status to the user. The display includes a light emitting diode with a plurality of color indicating options to display the validation status to the user. The wireless microphone system includes a wireless microphone, a wireless in-ear monitor, or wireless headphone.

Various embodiments include a computer-implemented method for receiving, at a first transmitter of a first wireless microphone system, an input for requesting a plurality of assigned frequencies for a plurality of wireless microphone systems including the first wireless microphone system, sending a first request, via a network, to a server for the set of assigned frequencies, and receiving, from the server, the plurality of assigned frequencies comprising a plurality of intermodulation free frequencies.

At least one technical advantage of the disclosed techniques relative to the prior art is that a cloud server automatically determines a set of assigned frequencies for a set of WMSs of a WMS setup upon receiving a user input at a transmitter (microphone) of any WMS included in the WMS setup. The server may automatically determine a set of intermodulation free frequencies for the set of assigned frequencies based on predefined data describing the WMS setup at a venue. The server may also dynamically re-determine the set of assigned frequencies for the WMS setup whenever receiving a request for the set of assigned frequencies from any transmitter of the WMS setup, for example, if intermodulation issues should arise before or during the performance at the venue. Thus, the disclosed techniques avoid the manual determination of the set of assigned frequencies for the WMS setup, which is time consuming and difficult.

Another technical advantage is the disclosed techniques allow a user of a particular WMS included in the WMS setup to easily validate an assigned frequency with the cloud server. When a transmitter of a particular WMS receives a user input requesting validation of the assigned frequency, the request is sent to the server which determines and sends a validation status of the assigned frequency to the transmitter. Another technical advantage is the disclosed techniques allow a user of a particular WMS included in the WMS setup to dynamically obtain a new assigned frequency from the cloud server. If an assigned frequency for a transmitter is determined by the server to be invalid, the server may send a new assigned frequency to the transmitter.

These technical advantages represent one or more technological advancements over prior art approaches.

BRIEF DESCRIPTION OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

FIGS. 5-6 illustrate a table depicting implementation of a daisy chained calculation stages for wireless microphone devices, in accordance with an exemplary embodiment of the present disclosure.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

The embodiments are described in part below with reference to flowchart illustrations and/or block diagrams of methods, systems, and computer program products and data structures according to embodiments herein. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

The present disclosure is a validation method and system which is capable of validating frequency assignment in a wireless microphone system and dynamically generating a precise set of intermodulation free frequencies. The present disclosure relates to validating assigned frequencies using the wireless microphone system by enabling Internetworking and determining a valid frequency setup for the wireless microphone system. This method is implemented using a chained stage calculation process which is capable of determining robustness of the frequency setup for a multi-band wireless microphone system and providing information regarding stability of audio quality of the wireless microphone system. The present disclosure provides more control on real time environment and quickly validates the assigned frequency before using the transmitter. This method is also capable of sharing a backup frequency between two microphone devices and validating the shared frequency.

Figure 1:
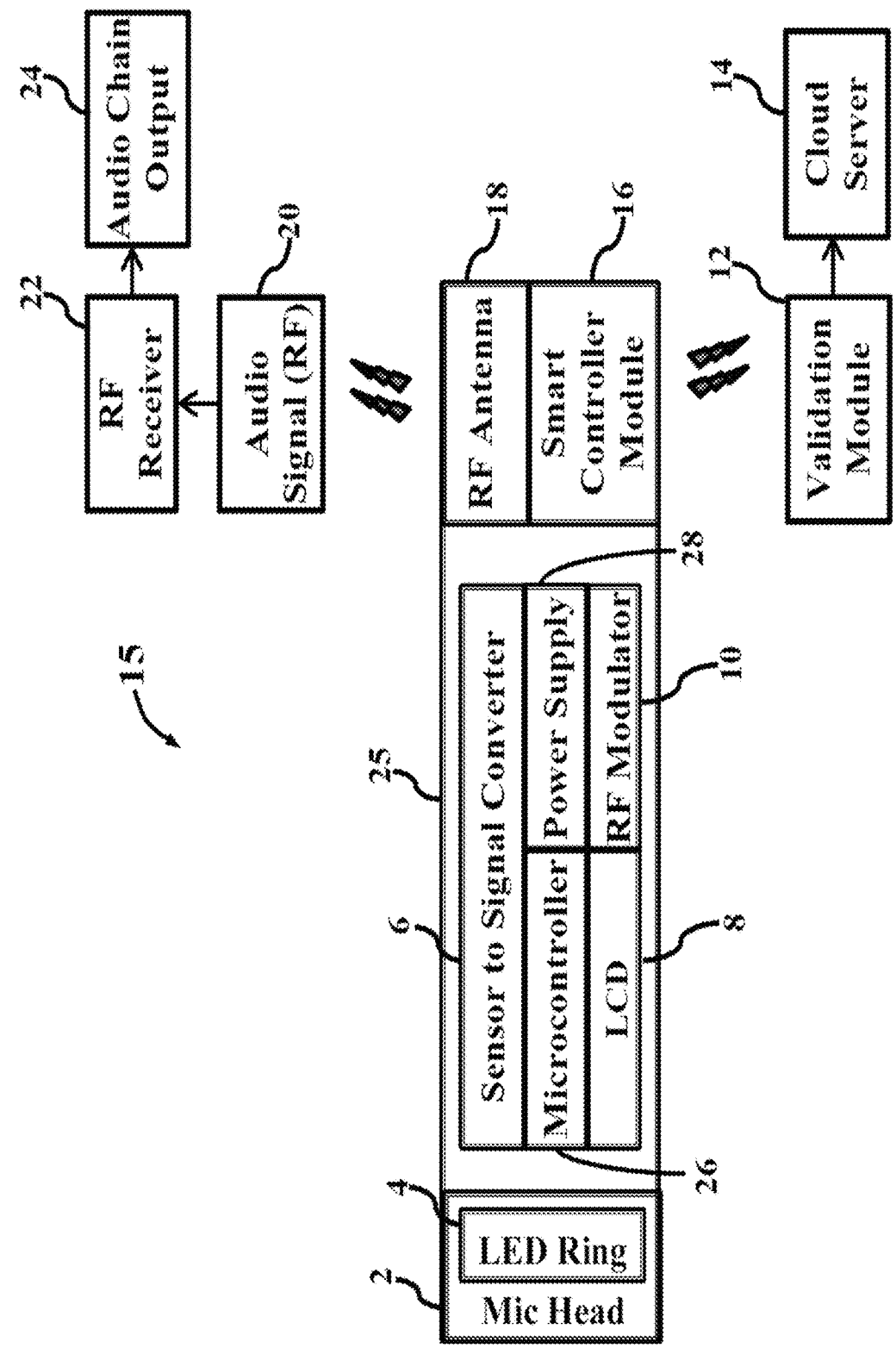
FIG. 1 illustrates a block diagram of a wireless microphone system configured with a smart controller module for validating an assigned frequency to the system, in accordance with an exemplary embodiment of the present disclosure.

FIG. 1 is a block diagram of a wireless microphone system (15) configured with a smart controller module (16) for validating an assigned frequency to the system (15) is illustrated, in accordance with an exemplary embodiment of the present disclosure. Note that in FIGS. 1-8 identical parts or elements are generally indicated by identical reference numerals.

The wireless microphone system (15) includes a microphone transmitter (25) to transmit a modulated audio signal over a radio frequency from a predefined band via a radio frequency antenna (18). The term "microphone transmitter" is also referred as transmitter only for the purpose of explanation, but not by the way of any limitations. The transmitter (25) includes a smart controller module (16), a sensor to signal converter (6), a microcontroller (26), a power supply (28) and a RF modulator (10). The microcontroller (26) may comprise any processing device capable of executing instructions of the smart controller module (16) for performing embodiments herein. The transmitter (25) further includes a display, such as a liquid crystal display (LCD) (8) to display a validation status to the user. The transmitter (25) may also include a light emitting diode (4) on a microphone head (2) capable of displaying a plurality of different colors for indicating the validation status to the user.

The wireless microphone system (15) also includes a wireless receiver (22) operable to wirelessly receive modulated audio signal (20) from the transmitter (25) via the radio frequency antenna (18) and processes the signal to provide an audio signal output (24). A WMS setup at a particular venue may include multiple wireless microphone systems (WMSs) (15), each WMS including a microphone transmitter (25) paired with a receiver (22). The microphone transmitter (25) can be for example, a wireless microphone, a wireless in-ear monitor, or wireless headphone. The transmitter (25) transmits data (audio) to the receiver (22) using modulation techniques such as (Frequency Modulation), where data is shifted to a higher frequency (RF range, typically 400-900 MHz) in a frequency domain. The data is then demodulated by the receiver (22) to produce the audio chain output (24) which is fed to further components in the audio chain. Each wireless microphone system (15) may be configured to operate in a particular predefined band, such as 500-800 MHz. Further, each wireless microphone system (15) included in a WMS setup will be assigned a particular frequency by the cloud server (14), such as 550 MHz, as described in embodiments herein. Thus, the transmitter (25) and the receiver (22) are synchronized for frequency and work with the unique assigned frequency.

The microphone transmitter (25) is connected to a server (14) via the smart controller module (16). In a preferred embodiment, the smart controller module (16) connects the wireless microphone system (15) to the server (14) via a network, such as a Local Area Network (LAN). The smart controller module (16) can be, for example, an Internet of Things (IoT) module or a Bot module, based on design consideration. In general, the Internet of things (IoT) is the network of physical devices, embedded with electronics, software, sensors, actuators, and connectivity which enables these objects to connect and exchange data via a network (Internet). The IoT allows objects to be sensed or controlled remotely across existing network infrastructure, creating opportunities for more direct integration of the physical world into computer-based systems, and resulting in improved efficiency, accuracy and economic benefit in addition to reduced human intervention. In general, an Internet Bot, also known as web robot, WWW robot or simply bot, is a software application that runs automated tasks (scripts) over the Internet. Typically, bots perform tasks that are both simple and structurally repetitive, at a much higher rate than would be possible for a human alone. The largest use of bots is in web spidering (web crawler), in which an automated script fetches, analyzes and files information from web servers at many times the speed of a human.

The server (14) may comprise a cloud server that is connected to the wireless microphone system (15) via the smart controller module (16) and a network. The term "cloud" can refer to a collection of resources (e.g., hardware, data and/or software) provided and maintained by an off-site or off-premise party (e.g., third party), wherein the collection of data and resources can be accessed by an identified user via a network. The resources can include data storage services, data processing services (e.g., applications), and many other services that are conventionally associated with and resident within personal computers or local or 'on-premise' servers. The data with respect to the frequency assignment for the wireless microphone system (15) is stored in the server (14).

The server (14) stores and executes a validation module (12) for determining a set of assigned frequencies and for validating any frequency assigned to a particular wireless microphone system (15). The set of assigned frequencies may be determined for a set of WMSs included in a WMS setup at a particular venue, each assigned frequency comprising an intermodulation free frequency. The server (14) may execute the validation module (12) for determining the set of assigned frequencies (intermodulation free frequencies) and for validating any frequency assigned to a particular wireless microphone system (15) in response to a user input being received at the wireless microphone system (15). The validation module (12) executing on the server (14) may interact with the smart controller module (16) executing on each wireless microphone system (15) for enabling communications between the server (14) and each wireless microphone system (15) for performing embodiments herein.

Figure 2:
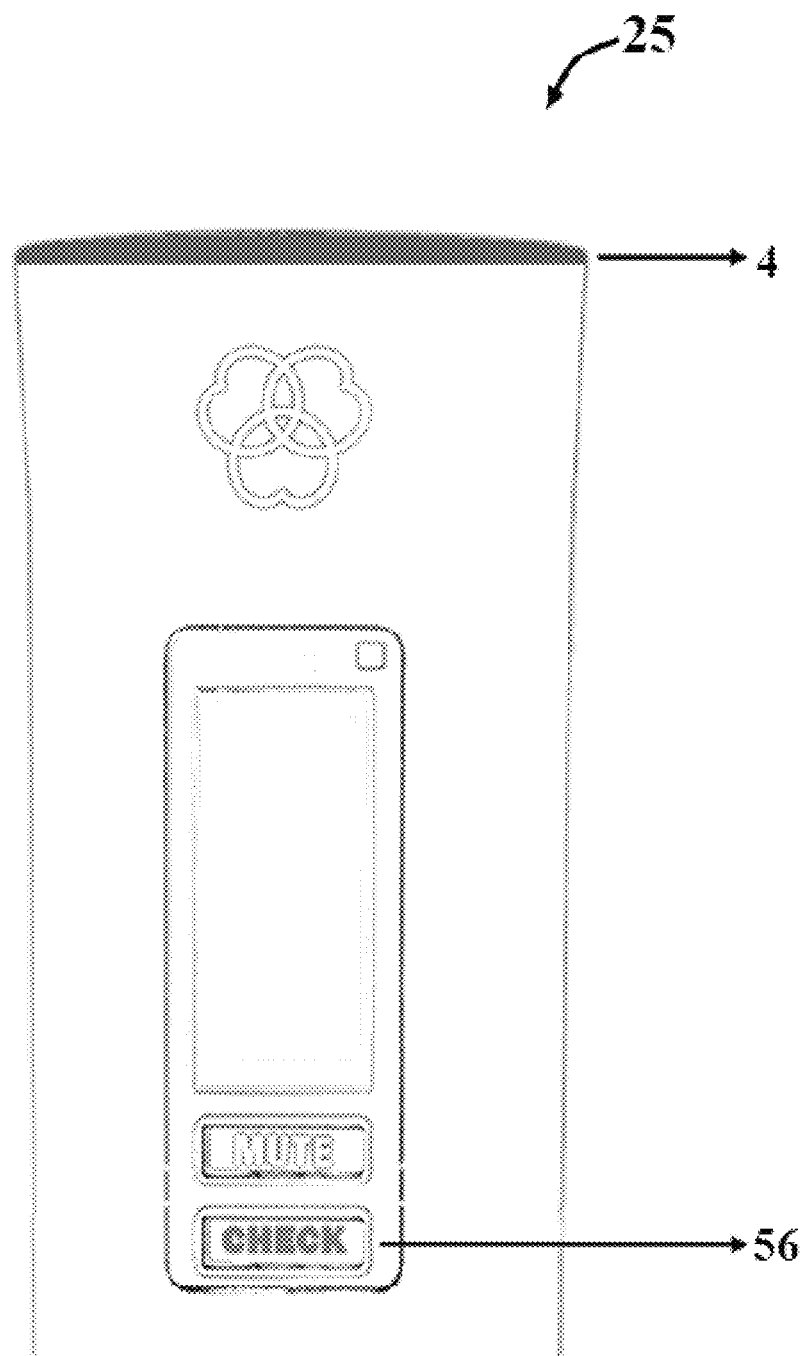
FIG. 2 illustrates a perspective view of a microphone transmitter having a validation button and a light emitting diode for displaying a validation status, in accordance with an exemplary embodiment of the present disclosure.

FIG. 2 illustrates a perspective view of the microphone transmitter (25), in accordance with an exemplary embodiment of the present disclosure. The microphone transmitter (25) includes a validation button (56) and the light emitting diode (4) for displaying the validation status. The validation button (56) is pressed by a user to validate the frequency assigned to the wireless microphone system (15). In a preferred embodiment, the validation button (56) can have multiple operations using multiple press patterns.

The light emitting diode (4) may display different colors to indicate various types of validation status of the frequency assigned to the wireless microphone system (15). For example, the light emitting diode (4) with a green color may indicate a valid status, a red color may indicate an invalid status, and a blue color may indicate an unknown status. For example, the green color disappears in 10 seconds, red remains until the frequency conflict is resolved. Until a response is received from the cloud server (14), the LED (4) may blink with the blue color to show a progress status. Alternatively, a mute button can also be used for this purpose.

Figure 3:
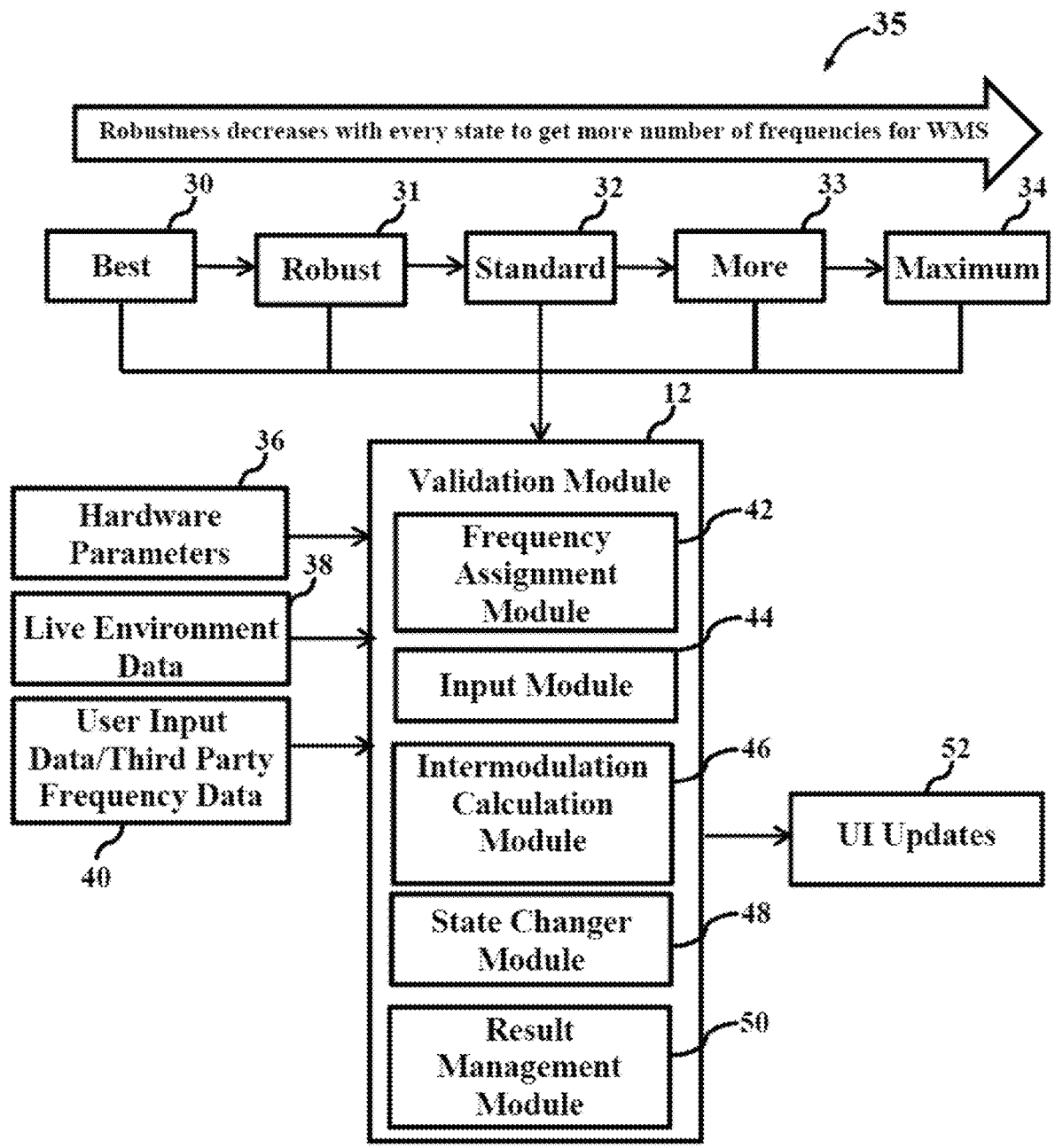
FIG. 3 illustrates an application block diagram of the wireless microphone system for determining robustness of the frequency setup using a chained stage calculation process, in accordance with an exemplary embodiment of the present disclosure.

FIG. 3 illustrates a block diagram (35) of the validation module 12 that may be implemented in the wireless microphone system (15), in accordance with an exemplary embodiment of the present disclosure. The validation module 12 may be executed for determining a set of assigned frequencies (comprising a set of intermodulation free frequencies) using a chained stage process based on different robustness indexes. The validation module (12) may be stored and executed by the server (14). The validation module (12) includes a frequency assignment module (42), an input module (44), an intermodulation calculation module (46), a state change module (48) and a result management module (50). The validation module (12) can include instructions, such as those of method (75) discussed herein with respect to FIG. 4, that are executed by a processor of the server (14).

The frequency assignment module (42) assigns frequencies to the wireless microphone system (15) based on a frequency band and requirement. The input module (44) receives a request from a user for validating the frequency assigned to the wireless microphone system (15), which transfers the assigned frequencies to the server (14) via the smart controller module (16). The intermodulation calculation module (46) prepares a frequency array based on a predefined data stored in the server (14) and the intermodulation calculation is performed for each set of frequencies in the frequency array. The predefined data includes for example, a hardware based distance parameter (36), data related to the installed wireless microphone system (15), environment data (38), a user input data and third party frequency data (40) and entire frequency set up data.

The state change module (48) assigns a robust index for each intermodulation free frequency from the frequency array and changes the calculation stage in a chained manner to generate a set of intermodulation free frequencies. Note that, in the chained stage calculation process the stages are daisy chained to get more precise frequency set up. The calculation stages are shifted in the daisy chained manner for each combination of the transmitters (25) in the wireless microphone system (15). The robustness of the intermodulation free frequency decreases with each change in the calculation stage. The robustness of the frequency assigned to the wireless microphone system (15) is determined using the robustness index. The robustness index is indexed as follows: Index 1: Best (30), Index 2: Robust (31), Index 3: Standard (32), Index 4: More (33), Index 5: Maximum (34). The result management module (50) generates a validation status for the assigned frequency based on the intermodulation free frequencies and the validation status from the server (14) is interpreted to provide a visual indication regarding the assigned frequency on the user interface of the wireless microphone transmitter (25), as shown at block (52). The microphone transmitter (25) receives the validation status from the server (14) and provides a visual indication regarding the validation status of the assigned frequency on the user interface, via the LCD (8) and/or light emitting diode (4), of the wireless microphone transmitter (25), as shown at block (52).

Figure 4:
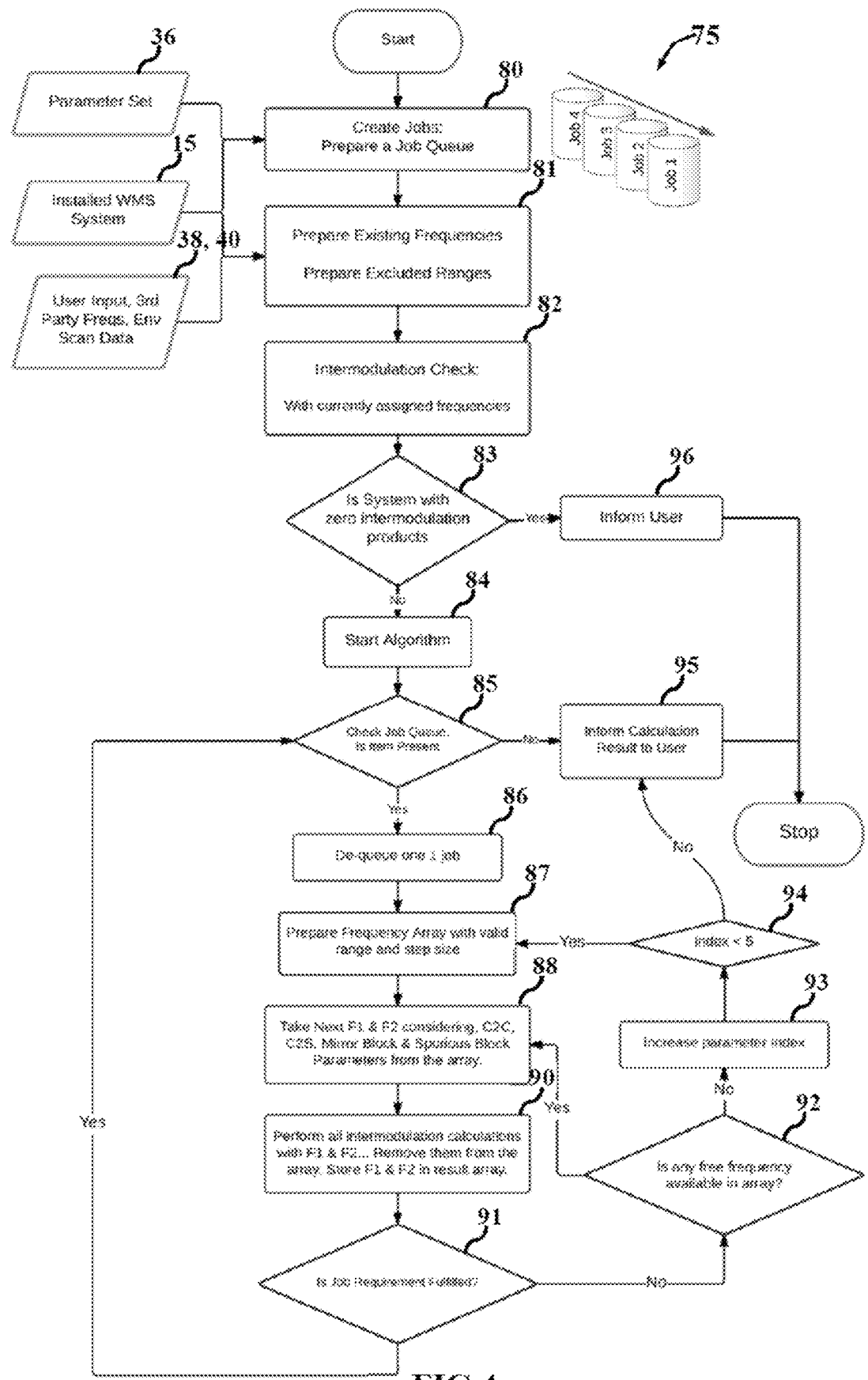
FIG. 4 illustrates a flow chart illustrating a method for validating frequency assignment in the wireless microphone system by installing the smart controller module on the microphone transmitter, in accordance with an exemplary embodiment of the present disclosure.

Referring to FIG. 4 a flow chart illustrating a method (75) for validating frequency assignment in the wireless microphone system (15) by installing the smart controller module (16) on the transmitter (25) of the wireless microphone system (15) is illustrated, in accordance with an exemplary embodiment of the present disclosure. A job is created by assigning frequencies to a plurality of microphone transmitters (25) based on a frequency band and a frequency requirement, as shown at block (80). Note that the term "job" relates to the process of frequency assignment to each microphone transmitter and are described for purposes of clarity and specificity; however, they should not be interpreted as limiting features of the disclosed embodiments. The existing frequencies and excluded frequencies is prepared based on a predefined data stored in the server (14) such as, for example, a hardware based distance parameter (36), data related to the installed wireless microphone system (15), environment data (38), a user input data and third party frequency data (40) and entire frequency set up data, as indicated at block (81). The job is transferred to the server (14) via the smart controller module (16) configured on the microphone transmitter (25) upon receiving a request from the user for validating the frequency assigned to the wireless microphone system (15), as shown at block (82).

A determination is made to check whether the wireless microphone system (15) is with zero intermodulation products, as illustrated at block (83). If the wireless microphone system (15) is with zero intermodulation products, the status can be informed to the user via the display (8), as shown at block (96). Otherwise the intermodulation calculation module (46) is started and the job queue is checked to find whether the item is present, as depicted at blocks (84) and (85). If the item is not present the calculation result is informed to the user, as shown at block (95). Otherwise, de-queue one job and a frequency array is prepared with valid range and size step, as indicated at blocks (86) and (87). Thereafter, next frequencies F1 and F2 from the array is taken considering C2C, C2S, mirror block and spurious block parameters from the array, as indicated at block (88). The intermodulation calculation with F1 and F2 is performed and the frequency F1 and F2 is removed from the array and stored in result array, as shown at block (90).

If the job requirement is fulfilled and if the item is not present in the job queue then calculation result is informed to the user, as indicated at blocks (91), (85) and (95). Otherwise, check whether any free frequency is available in array, as shown at block (92). If free frequency is available in the array, the intermodulation calculation for next set of frequencies is continued. Otherwise, a parameter index is increased and a determination is made whether the index is less than five, as shown at blocks (93) and (94). If the index is less than five another frequency array is prepared as shown at block (87), otherwise the calculation result (validation status) is informed to the user, as indicated at block (95).

The wireless microphone system (15) can be analog or digital based on modulation scheme. Also, the wireless microphone system (15) can have single channel/dual channel receiver. For example, consider the following types of devices available for use as a wireless microphone system. Each type of device is configured to operate within a particular band (e.g., 680-710 Mhz). Each device comprises a pairing of a transmitter and receiver:

Device 1: In-Air monitoring System, Supports 680-710 MHz
Device 2: Digital WMS, Supports RF band 510-720 MHz
Device 3: Analog WMS, Supports RF band 650-680 MHz
Stages: S1, S2, S3, S4, S5

The possible combinations with these wireless microphone devices are as follows:
Device 1+Device 2
Device 1+Device 3
Device 2+Device 3
Device 1+Device 2+Device 3

The stages are daisy chained in following way:
S1→S2→S3→S4→S5

Figure 6:
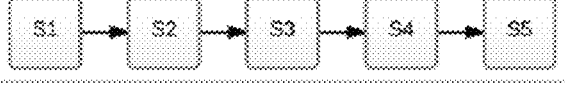
Figure 6:
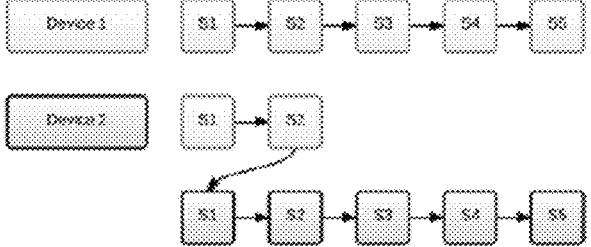
Figure 6:
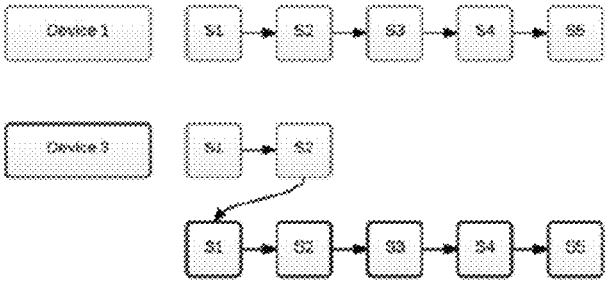
Figure 6:
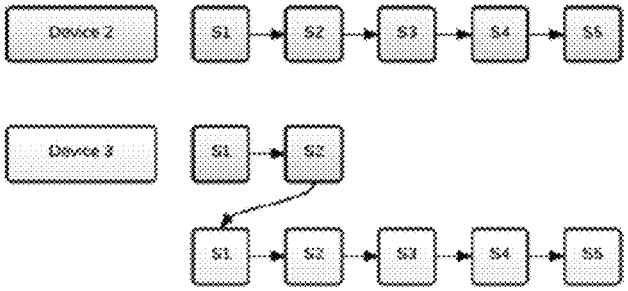
Figure 6:
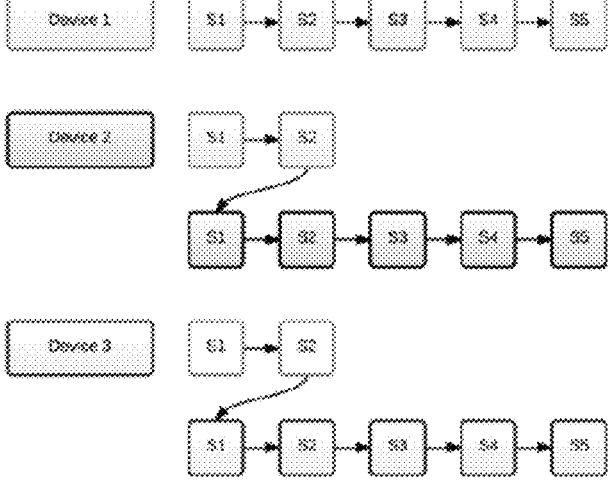

The implementation of the daisy chained stages with respect to the devices 1, 2, and 3 are illustrated in FIGS. 5-6. For device 1 the stages won't change, but for device 2, the stages are daisy chained as shown in FIG. 6 to get more precise frequency setup. The stages can be arranged in any way providing flexibility and modularity to the intermodulation calculation. The method (75) provides precise set of intermodulation free frequencies. The robustness index of the result provides information about the stability of audio quality for the wireless microphone system (15).

Figure 7:
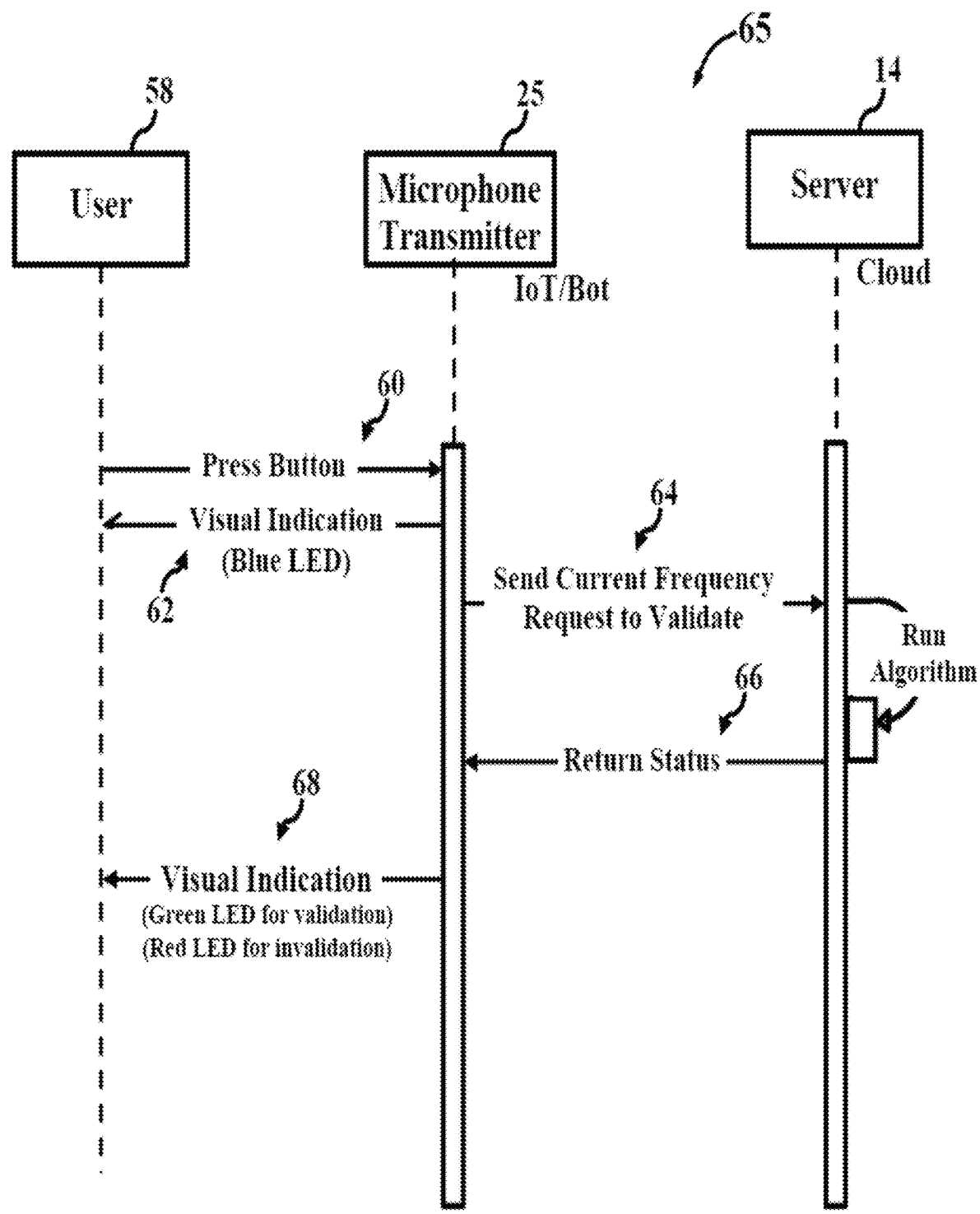
FIG. 7 illustrates a sequence diagram for validating the frequency assigned to the wireless microphone system using the smart controller module installed on the microphone transmitter, in accordance with an exemplary embodiment of the present disclosure.

FIG. 7 illustrates a sequence diagram (65) for validating frequency assignment in the microphone system (15), in accordance with an exemplary embodiment of the present disclosure. When a user (58) presses the validation button (56) for validating the frequency assigned to the wireless microphone system (15) as indicated by arrow (60), a visual indication will indicate a current validation status of unknown. For example, a blue LED (4) may glow on the tip of the microphone transmitter (25), as shown by arrow (62).

The job is transferred to the server (14) via the smart controller module (16) for example, IoT module or Bot module configured on the microphone transmitter (25) upon receiving a request from the user (58) for validating current frequency assigned to the wireless microphone system (15), as indicated by arrow (64). The intermodulation calculation is executed on the server (14) and a validation status for the assigned frequency is generated based on the intermodulation free frequencies. The server (14) then returns a validation status for the assigned frequency to the smart controller module (16), as shown by arrow (66). The user interface, such as the LCD (8) and/or LED (4), of the wireless microphone transmitter (25) provides a visual indication based on the returned validation status, as shown by arrow (68). For example, a green LED (4) may glow to indicate a valid status and a red LED (4) may glow to indicate an invalid status.

Figure 8:
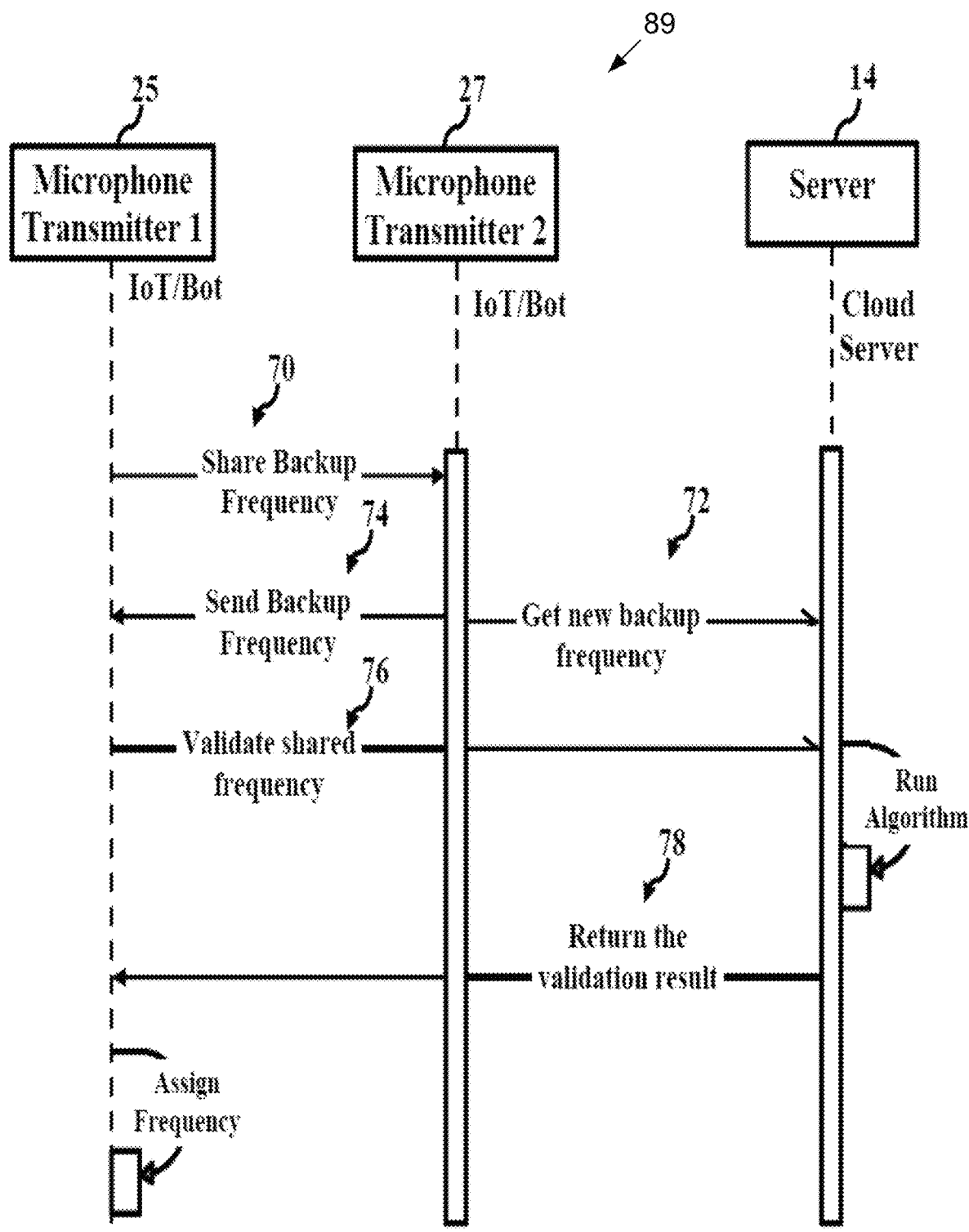
FIG. 8 illustrates a sequence diagram for sharing a backup frequency between microphone transmitters upon receiving a request from a user for frequency sharing, in accordance with an exemplary embodiment of the present disclosure.

Referring to FIG. 8 a sequence diagram (89) for sharing a backup frequency between microphone transmitters (25) and (27) upon receiving a request from the user (58) for frequency sharing is illustrated, in accordance with an exemplary embodiment of the present disclosure. A request for sharing back up frequency from the first microphone transmitter (25) to the second microphone transmitter (27) is sent, as shown by arrow (70). The request is transferred to the server (14) via the smart controller module (16) for example, IoT module or Bot module configured on the second wireless microphone transmitter (27) upon receiving a request from the user (58) for sharing the backup frequency assigned to the second wireless microphone transmitter (27), as indicated by arrow (72).

The backup frequency from the second microphone transmitter (27) is sent to first microphone transmitter (25), as indicated by arrow (74). A request is received from the user (58) for validating shared frequency assigned to the microphone transmitter (25), as indicated by arrow (76). The algorithm is executed and a validation status for the assigned frequency is generated based on the intermodulation free frequencies and the validation status is interrupted from the server (14) to provide a visual indication for example, green Led for validation and a red LED for invalidation regarding the assigned frequency on the user interface of the wireless microphone transmitter (25) and (27), as shown by arrow (78).

Figure 9:
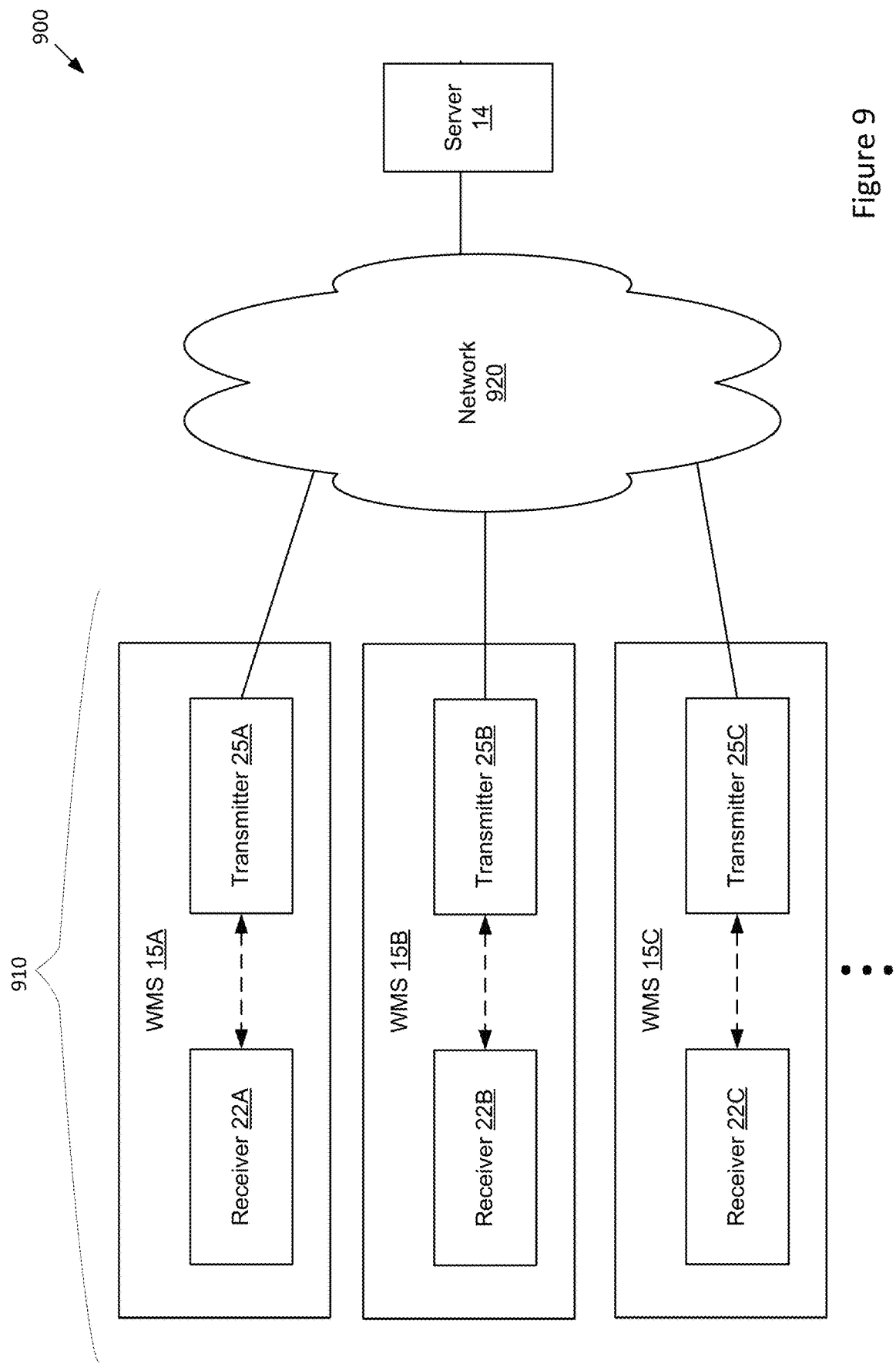
FIG. 9 illustrates a frequency assignment system 900 configured to implement one or more aspects of the present embodiments.

FIG. 9 illustrates a frequency assignment system 900 configured to implement one or more aspects of the present embodiments. As shown, the frequency assignment system 900 includes a server 14 and a plurality of WMSs 15 (e.g., 15A-15N) coupled via a network 920. The plurality of WMSs 15 may comprise a WMS setup located at a particular venue 910 for use during a planned performance (e.g., music concert, speaking event, etc.). Each WMS 15 may comprise a microphone transmitter 25 that transmits audio data in a modulated form (RF) to a paired receiver 22 at a particular assigned frequency.

The network 920 may comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others. In some embodiments, each WMS 15 comprises an Internet of things (IoT) device configured with an IoT module. In these embodiments, each WMS 15 may communicate with the server (14) as well as other WMSs 15 via the network 920.

Each WMS 15 may communicate with the server and other WMSs 15 via the network 920 for performing the embodiments described herein.

Each WMS 15 may be configured to operate within a predefined RF band. For example, the WMS setup at the venue 910 may include 25 separate WMSs comprising three different WMS types: Device1, Device2, and Device3. The venue 910 may include 10 separate WMSs that are of the Device1 type which are each configured to operate within band1 (e.g., 680-710 MHz). The venue 910 may also include 10 separate WMSs that are of the Device2 type which are each configured to operate within band2 (e.g., 510-720 MHz). The venue 910 may further include 5 separate WMSs that are of the Device3 type which are each configured to operate within band3 (e.g., 650-680 MHz). Each WMS 15 also operates at a specific assigned frequency within the predefined RF band of the WMS 15.

In some embodiments, a user may request from the server 14 a set of assigned frequencies for the plurality of WMSs 15 located at the particular venue 910. For example, the user of any transmitter 25 at the venue may press a button 56 on the transmitter 25 in a first particular manner (e.g., using a long press) to request the set of assigned frequencies for the venue. In response, the server 14 determines and transmits a set of assigned frequencies to one or more transmitters 25 at the venue, each assigned frequency comprising a frequency determined by the server 14 to be an intermodulation free frequency. In further embodiments, in addition to the set of assigned frequencies for the venue 910, the server 14 may also determine a set of backup frequencies for the venue 910, each backup frequency also comprising a frequency determined by the server 14 to be an intermodulation free frequency. In these embodiments, the server 14 determines a set of intermodulation free frequencies comprising a set of assigned frequencies and a set of backup frequencies for the venue. The server 14 may determine the set of intermodulation free frequencies for a venue based on predefined data describing a WMS setup located at the venue using chained stages based on different robustness levels.

The server may then transmit the set of assigned frequencies to the requesting transmitter 25, which then communicates with the other transmitters 25 at the venue via the network 920 for distributing the set of assigned frequencies across the plurality of transmitters 25 located at the venue. In other embodiments, the server may transmit each assigned frequency in the set of assigned frequencies directly to each transmitter 25 located at the venue via the network 920.

After each transmitter 25 at the venue 910 obtains an assigned frequency, a user of a particular transmitter 25 may request that the server 14 validate the assigned frequency of the particular transmitter 25. For example, the user may press a button 56 on the transmitter 25 in a second particular manner (e.g., using a short press) to request validation of the assigned frequency. There are various reasons why a user may wish to validate the assigned frequency. For example, a user may want to verify before the performance begins to ensure the transmitter 25 received a valid assigned frequency as some errors may have occurred in the various operations for assigning and distributing the assigned frequencies to the transmitters 25 at the venue 910. In some cases, an error may have occurred whereby a transmitter 25 receives the wrong frequency as the assigned frequency. As another example, during the performance, a particular transmitter 25 may be experiencing intermodulation issues/products with the paired receiver 22. In this case, the user of the particular transmitter 25 may also want to validate the assigned frequency with the server.

In response to the validation request from a particular transmitter 25, the server 14 may compare the assigned frequency of the particular transmitter 25 to the set of assigned frequencies for the venue 910. If the set of assigned frequencies for the venue 910 includes the assigned frequency, the server transmits a response to the particular transmitter 25 indicating that the assigned frequency is valid. The particular transmitter 25 then displays an indicator signaling to the user that the assigned frequency is valid. If the set of assigned frequencies for the venue 910 does not include the assigned frequency, the server transmits a response to the particular transmitter 25 indicating that the assigned frequency is invalid. The particular transmitter 25 then displays an indicator signaling to the user that the assigned frequency is invalid. If the assigned frequency is determined to be invalid, the server may also retrieve a backup frequency from the set of backup frequencies determined for the venue 910. The server may transmit the backup frequency to the particular transmitter 25, which then configures the transmitter 25 and corresponding receiver 22 to operate at the new assigned frequency (the backup frequency).

Figure 10:
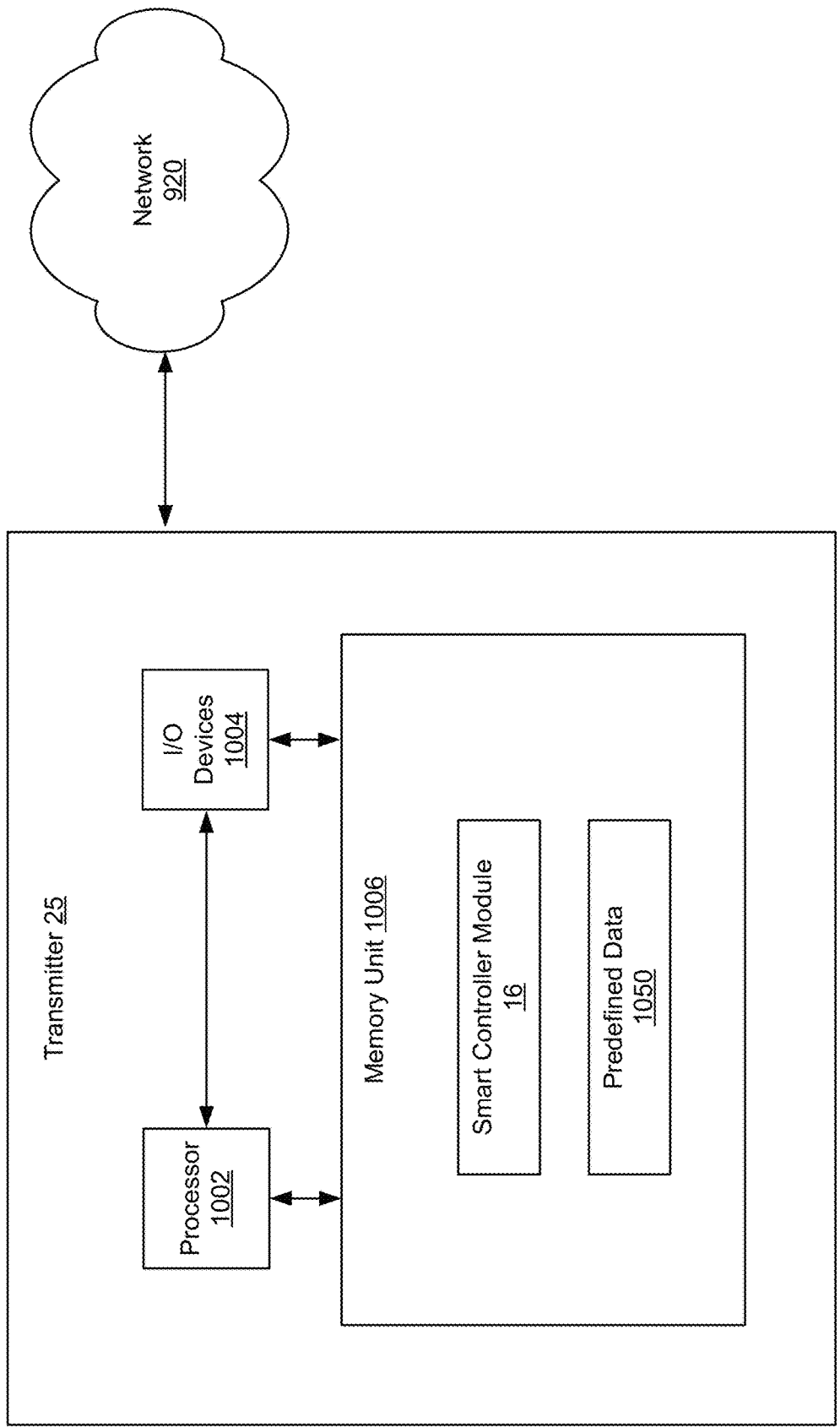
FIG. 10 illustrates an exemplary transmitter device that can be implemented in the frequency assignment system of FIG. 9, according to various embodiments.

FIG. 10 illustrates an exemplary transmitter device that can be implemented in the frequency assignment system 900 of FIG. 9, according to various embodiments. The transmitter 25 may comprise a computing device or machine, such as an Internet of things (IoT) device, or any other type of computing device suitable for practicing various embodiments herein. The transmitter 25 comprises at least one processor 1002, input/output (I/O) devices 1004, and a memory unit 1006, coupled together. The transmitter 25 is coupled to a network 920 via a network interface (not shown). The transmitter 25 may further include elements and components as described above in relation to FIG. 1 (such as the radio frequency antenna (18), sensor to signal converter (6), power supply (28), RF modulator (10), and the like), and are not discussed in detail here.

In general, a processor 1002 may be any technically feasible processing device or hardware unit capable of processing data and executing software applications and program code. The processor 1002 executes the software and performs the functions and operations set forth in the embodiments described herein. For example, a processor 1002 may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, microcontroller, or any combination of different processing units, such as a CPU configured to operate in conjunction with a GPU.

The memory unit 1006 may include a hard disk, a random access memory (RAM) module, a flash memory unit, or any other type of memory unit or combination thereof. Processor and I/O devices read data from and write data to memory 1006. The memory unit 1006 is configured to store software application(s) and data. Instructions from the software constructs within the memory unit 1006 are executed by processors to enable the operations and functions described herein. In various embodiments, the memory unit 1006 is configured to store a smart controller module (16) and predefined data 1050 for performing embodiments herein. The processor 1002 is configured to execute the smart controller module (16) to provide an underlying functionality of the frequency assignment system 900 as described in various embodiments herein.

I/O devices 1004 are also coupled to memory 1006 and may include input devices capable of receiving input, such as a keyboard, a mouse, a trackball, and so forth, as well as output devices capable of providing output, such as a display, speaker, and so forth. Additionally, I/O devices may include devices capable of both receiving input and providing output, such as a touchscreen, a universal serial bus (USB) port, and so forth. In particular, the input devices may include a validation button (56) that is pressed by a user to perform various functions that are selectable using different press patterns. For example, a user may request from the server 14 a set of assigned frequencies for the plurality of WMSs 15 located at a particular venue 910 by pressing the button 56 using a first press pattern (e.g., using a long press or two presses). For example, a user may request validation of an assigned frequency from the server 14 by pressing the button 56 using a second press pattern (e.g., using a short press or a single press). The input devices may further enable a user to input predefined data 1050 describing a WMS setup at a particular venue. The predefined data 1050 may be stored to memory 1006 and transmitted to the server 14 via the network 920. The output devices may include the LCD 8 and/or LED 4 for displaying a validation status to the user.

Figure 11:
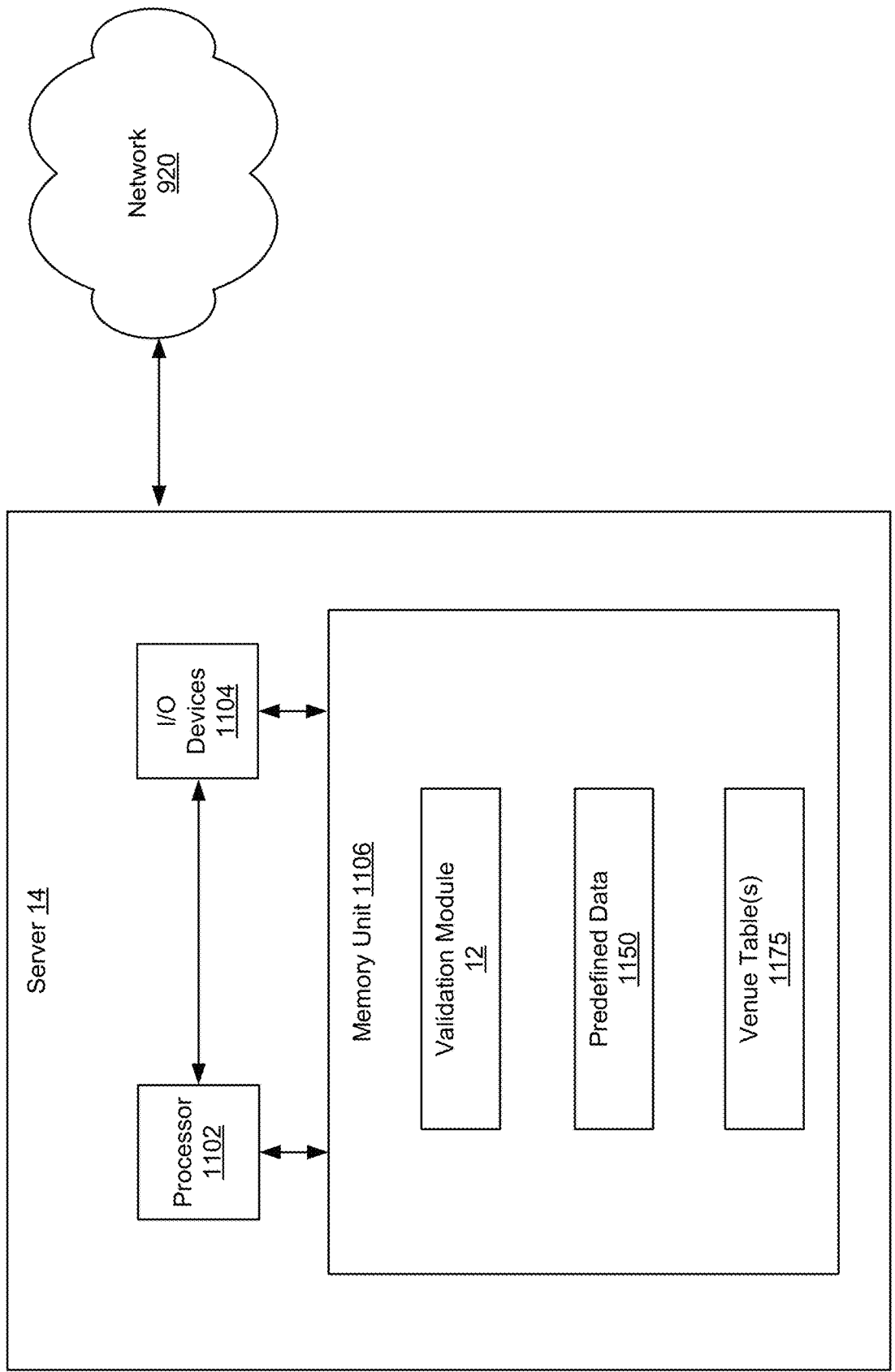
FIG. 11 illustrates an exemplary server 14 that can be implemented in the frequency assignment system of FIG. 9, according to various embodiments.

FIG. 11 illustrates an exemplary server 14 that can be implemented in the frequency assignment system 900 of FIG. 9, according to various embodiments. The server 14 may comprise a computing device or machine, such as a server system, desktop computer, laptop computer, or any other type of computing device suitable for practicing various embodiments herein. The server 14 comprises at least one processor 1102, input/output (I/O) devices 1104, and a memory unit 1106, coupled together. The server 14 is coupled to a network 920 via a network interface (not shown).

In general, a processor 1102 may be any technically feasible processing device or hardware unit capable of processing data and executing software applications and program code. The processor 1102 executes the software and performs the functions and operations set forth in the embodiments described herein. For example, a processor 1102 may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, microcontroller, or any combination of different processing units, such as a CPU configured to operate in conjunction with a GPU. I/O devices 1104 are also coupled to memory 1106 and may include input devices capable of receiving input, such as a keyboard, a mouse, a trackball, and so forth, as well as output devices capable of providing output, such as a display, speaker, and so forth. Additionally, I/O devices may include devices capable of both receiving input and providing output, such as a touchscreen, a universal serial bus (USB) port, and so forth.

The memory unit 1106 may include a hard disk, a random access memory (RAM) module, a flash memory unit, or any other type of memory unit or combination thereof. Processor and I/O devices read data from and write data to memory 1106. The memory unit 1106 is configured to store software application(s) and data. Instructions from the software constructs within the memory unit 1106 are executed by processors to enable the operations and functions described herein. In various embodiments, the memory unit 1106 is configured to store a validation module (12), predefined data 1150, and one or more venue tables 1175 for performing embodiments herein.

The predefined data 1150 may comprise predefined data 1050 received from a transmitter 25 via the network 920. In other embodiments, the predefined data 1150 may include data obtained through other means than the transmitter 25, for example, received through user input via the I/O devices 1104 of the server 14 or received from other computing devices via the network 920. The predefined data 1150 may describe a WMS setup at a particular venue. In general, the predefined data includes for example, a hardware based distance parameter (36), data related to the installed wireless microphone system (15), environment data (38), a user input data and third party frequency data (40) and entire frequency set up data. For example, the predefined data may specify that the WMS setup comprises 10 WMSs configured to operate within a first RF band (band1), 10 WMSs configured to operate within a second RF band (band2), and 5 WMSs configured to operate within a third RF band (band3). The predefined data may further specify the available frequency range allotted by a particular region/country where the venue is located. Each different region/country may allot different frequency ranges for performances at venues. Thus, when the venue is changed, the available frequency range may also change. The predefined data may further specify frequencies assigned to any 3rd party transmitters from other 3rd party venues that are the current venue, which may cause interference (intermodulation problems) with the WMS setup at the current venue.

The processor 1102 is configured to execute the validation module (12) to provide an underlying functionality of the frequency assignment system 900 as described in various embodiments herein. The validation module (12) may comprise various modules as described above in relation to FIG. 3, such as the frequency assignment module (42), input module (44), intermodulation calculation module (46), state change module (48), and the result management module (50). In particular, the server may execute the validation module (12) to generate a set of intermodulation free frequencies for a particular venue based on the predefined data 1150 for the particular venue. The set of intermodulation free frequencies for a WMS setup at a particular venue may be stored to a venue table 1175 associated with the venue.

A venue table 1175 may store a venue identifier (ID), a set of transmitter identifiers (IDs), and the set of intermodulation free frequencies. The venue ID may uniquely identify the WMS setup at a particular venue. Each transmitter ID in the set of transmitter IDs may uniquely identify each transmitter 25 deployed/implemented at the WMS setup at the particular venue. The set of intermodulation free frequencies may comprise a set of assigned frequencies and a set of backup frequencies for the venue. Each assigned frequency in the set of assigned frequencies may be assigned to and associated with a particular transmitter ID corresponding to a particular transmitter 25 deployed at the venue. The set of backup frequencies may comprise intermodulation free frequencies that are not yet assigned to a particular transmitter ID/transmitter 25.

Figure 12A:
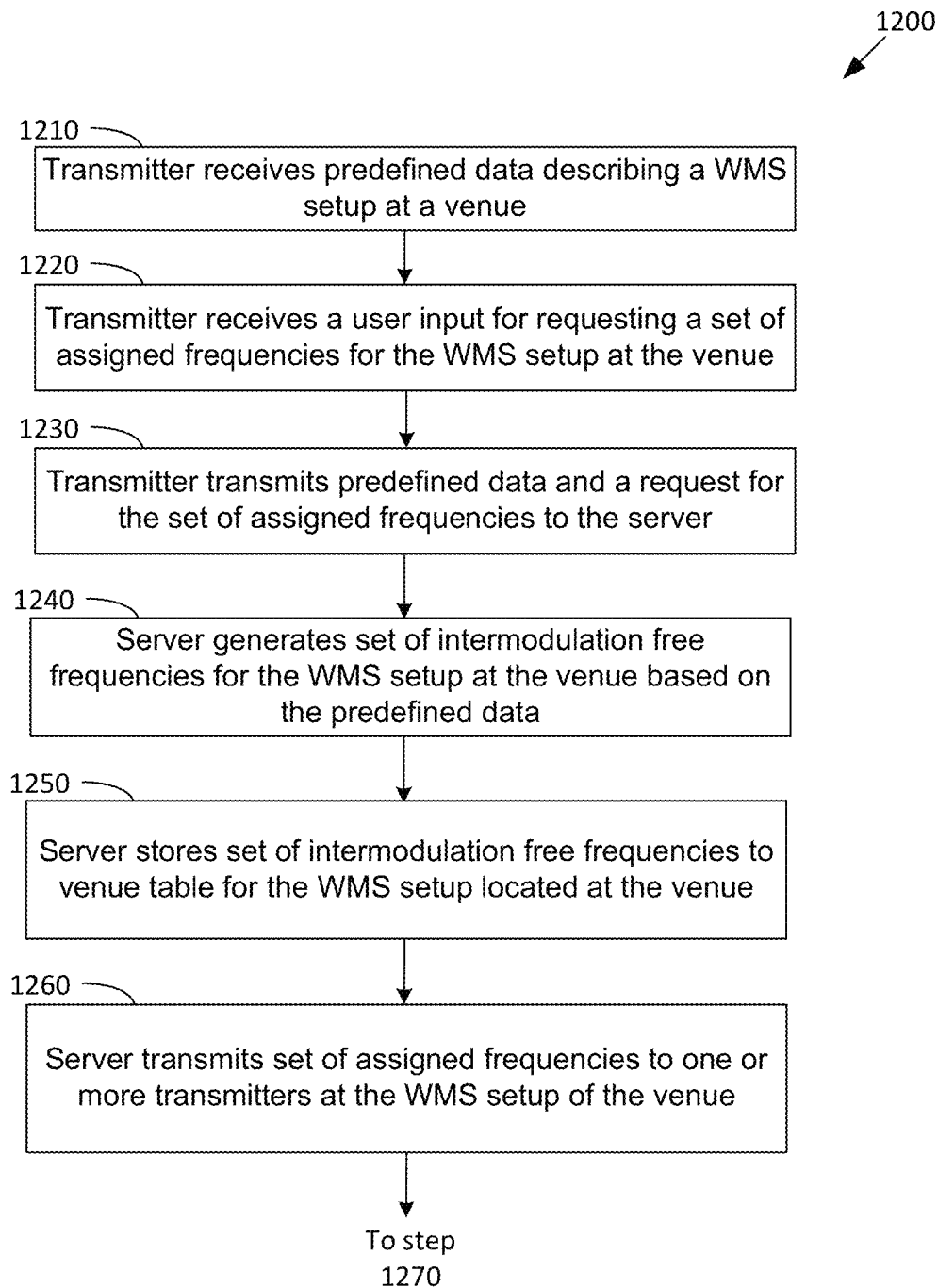
FIGS. 12A-12B illustrate a flow diagram of method steps for generating and validating assigned frequencies for a venue, according to various embodiments.
Figure 12B:
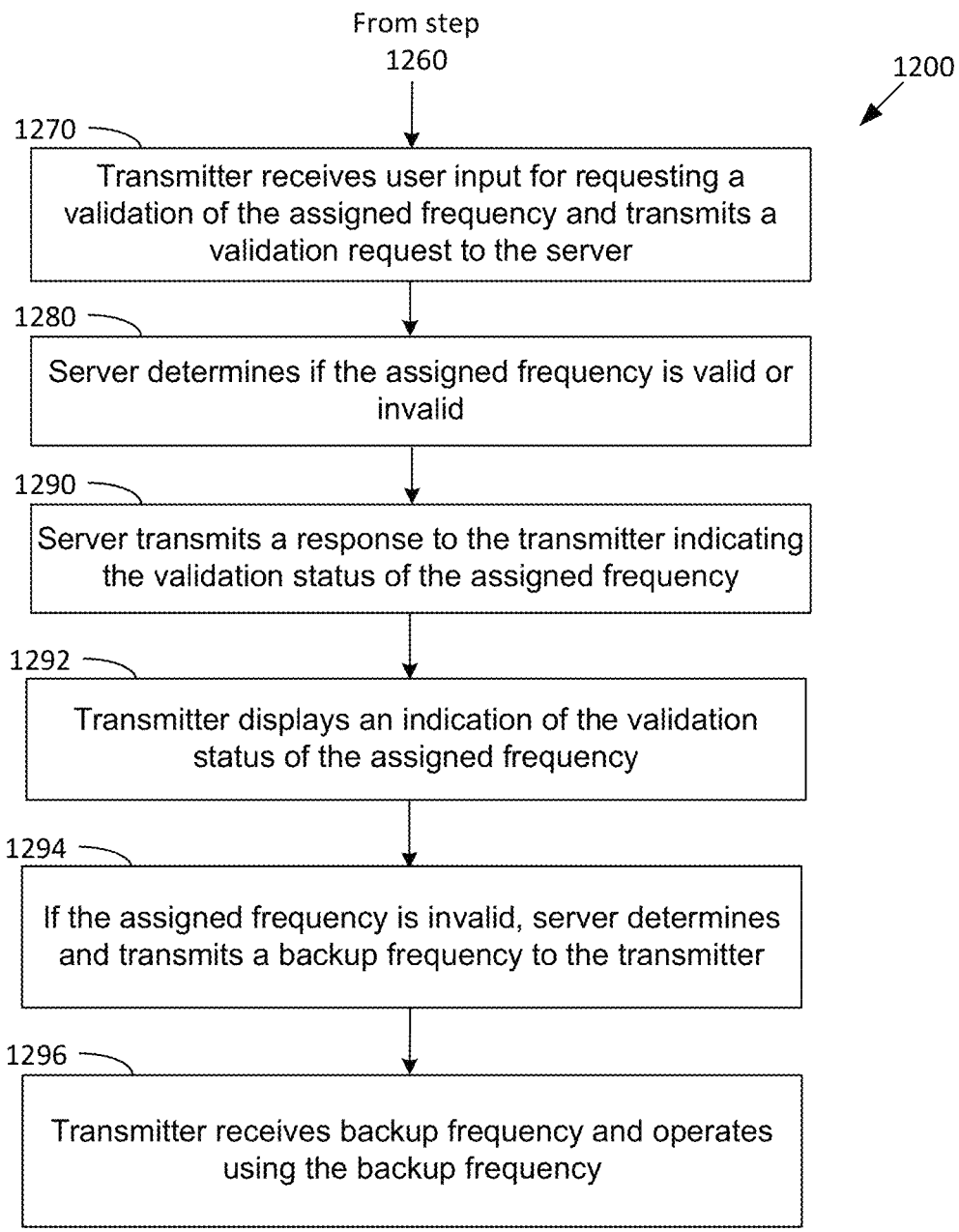

FIGS. 12A-12B illustrate a flow diagram of method steps for generating and validating assigned frequencies for a venue, according to various embodiments. Although the method steps are described in conjunction with the systems of FIGS. 1-3 and 5-11, persons skilled in the art will understand that the method steps can be performed in any order by any system. In some embodiments, the method 1200 may be performed by the validation module 12 executing on the server 14 in conjunction with one or more smart controller modules 16 executing on one or more transmitters 25.

The method 1200 begins at step 1210, where a first transmitter 25 receives (at step 1210) predefined data (e.g., via input devices of the first transmitter 25) describing a WMS setup at a venue. For example, the predefined data may specify that the WMS setup comprises 10 WMSs configured to operate within a first RF band (band1), 10 WMSs configured to operate within a second RF band (band2), and 5 WMSs configured to operate within a third RF band (band3). The predefined data may include any other information describing the WMS setup at the venue, such as the available frequency range allotted by a particular region/country where the venue is located. The first transmitter 25 may store the predefined data in a memory 1006.

The first transmitter 25 receives (at step 1220) a first user input (e.g., via a button 56) for requesting a set of assigned frequencies for the WMS setup at the venue. In response, the first transmitter 25 transmits (at step 1230) the predefined data and a request for the set of assigned frequencies to the server 14 via a network 920. In response, the server 14 generates (at step 1240) a set of intermodulation free frequencies for the WMS setup at the venue based on the predefined data, as discussed in relation to FIG. 13. The set of intermodulation free frequencies comprises a set of assigned frequencies and a set of backup frequencies. For example, if the WMS setup comprises 25 WMSs requiring 25 assigned frequencies, the set of intermodulation free frequencies may comprise 25 assigned frequencies and 5 backup frequencies for a total of 30 intermodulation free frequencies. The server 14 stores (at step 1250) the set of intermodulation free frequencies to a venue table 1175 for the WMS setup located at the venue. The venue table 1175 may store a venue identifier (ID), a set of transmitter identifiers (IDs), and the set of intermodulation free frequencies comprising a set of assigned frequencies and a set of backup frequencies for the venue.

The server 14 transmits (at step 1260) the associated venue identifier (ID) and the set of assigned frequencies to one or more transmitters 25 at the WMS setup of the venue. For example, server 14 may transmit the set of assigned frequencies to the first transmitter 25, which then communicates with the other transmitters 25 at the venue via the network 920 for distributing the set of assigned frequencies across the plurality of transmitters 25 located at the venue. In other embodiments, the server may transmit each assigned frequency in the set of assigned frequencies directly to each transmitter 25 located at the venue via the network 920. Thus, at this point, each transmitter 25 located at the venue has received/obtained the associated venue identifier (ID) and an assigned frequency for operating and communicating with the corresponding receiver 22 at the venue.

A second transmitter 25 then receives (at step 1270) a second user input (e.g., via a button 56) for requesting a validation of the assigned frequency of the second transmitter and transmits a validation request and the venue identifier (ID) and assigned frequency to the server 14 via a network 920. The second transmitter 25 may comprise the first transmitter 25 or any other transmitter 25 at the venue. In response, the server 14 determines (at step 1280) if the assigned frequency for the second transmitter 25 is a valid or invalid intermodulation free frequency for the venue. The server 14 may do so by retrieving the corresponding venue table 1175 based on the received venue identifier (ID) and examining the set of intermodulation free frequencies stored to the corresponding venue table 1175. In some embodiments, if the set of intermodulation free frequencies stored to the corresponding venue table 1175 includes the assigned frequency received from the second transmitter 25, the server 14 determines that the assigned frequency is valid (is a valid intermodulation free frequency determined for the particular venue). However, if the set of intermodulation free frequencies do not include the assigned frequency received from the second transmitter 25, the server 14 determines that the assigned frequency is not valid (is not a valid intermodulation free frequency determined for the particular venue).

The server 14 then transmits (at step 1290) a response to the second transmitter 25 indicating the validation status of the assigned frequency (whether the assigned frequency is valid or invalid). The second transmitter 25 then displays (at step 1292) an indication of the validation status of the assigned frequency. For example, the second transmitter 25 may include the LCD 8 and/or LED 4 for displaying the validation status to the user.

If the validation status of the assigned frequency is determined to be invalid by the server 14, in response, the server 14 determines and transmits (at step 1294) a backup frequency to the second transmitter 25. The server 14 may do so by retrieving the set of backup frequencies from the corresponding venue table 1175 and selecting and transmitting one of the backup frequencies in the set of backup frequencies to the second transmitter 25. The server 14 also modifies the corresponding venue table 1175 by removing the transmitted backup frequency from the set of backup frequencies and adds the transmitted backup frequency to the set of assigned frequencies for the venue. The second transmitter 25 receives (at step 1296) the backup frequency and re-configures the second transmitter 25 and corresponding receiver 22 to operate using the new backup frequency. The method 1200 then ends.

The method 1200 may also be repeated dynamically at any time as needed for the venue. For example, the method 1200 may be re-performed to determine a new set of assigned frequencies for the venue if several of the WMSs 15 located at the venue are experiencing RF interference issues (intermodulation products). For example, the intermodulation issues/products may be caused by a new third party transmitter being implemented at or near the venue, whereby new predefined data may be uploaded to the server 14 for determining a new set of assigned frequencies for the venue based on the new predefined data. Advantageously, the method 1200 may be re-performed dynamically and efficiently at any time by a user simply selecting a button on the transmitter 25 for requesting a new set of intermodulation free frequencies to be assigned to the venue. A further advantage is that the method 1200 may be re-performed dynamically and efficiently at any time to also validate an assigned frequency for a particular transmitter 25 by the user simply selecting the button on the transmitter 25.

Further, the method 1200 may also be repeated for a new venue by simply updating the predefined data to describe a new WMS setup at the new venue. For example, the new venue may require more or fewer WMSs 15 operating at different bands, the new venue may be in a different country that allows a different RF bandwidth for use in performances, the new venue may have additional 3rd party transmitters near the venue, etc. The new predefined data describing the new WMS setup at the new venue may be input to a transmitter 25 and transmitted to the server 14, which determines a set of set of intermodulation free frequencies based on the new predefined data for the new venue.

Figure 13:
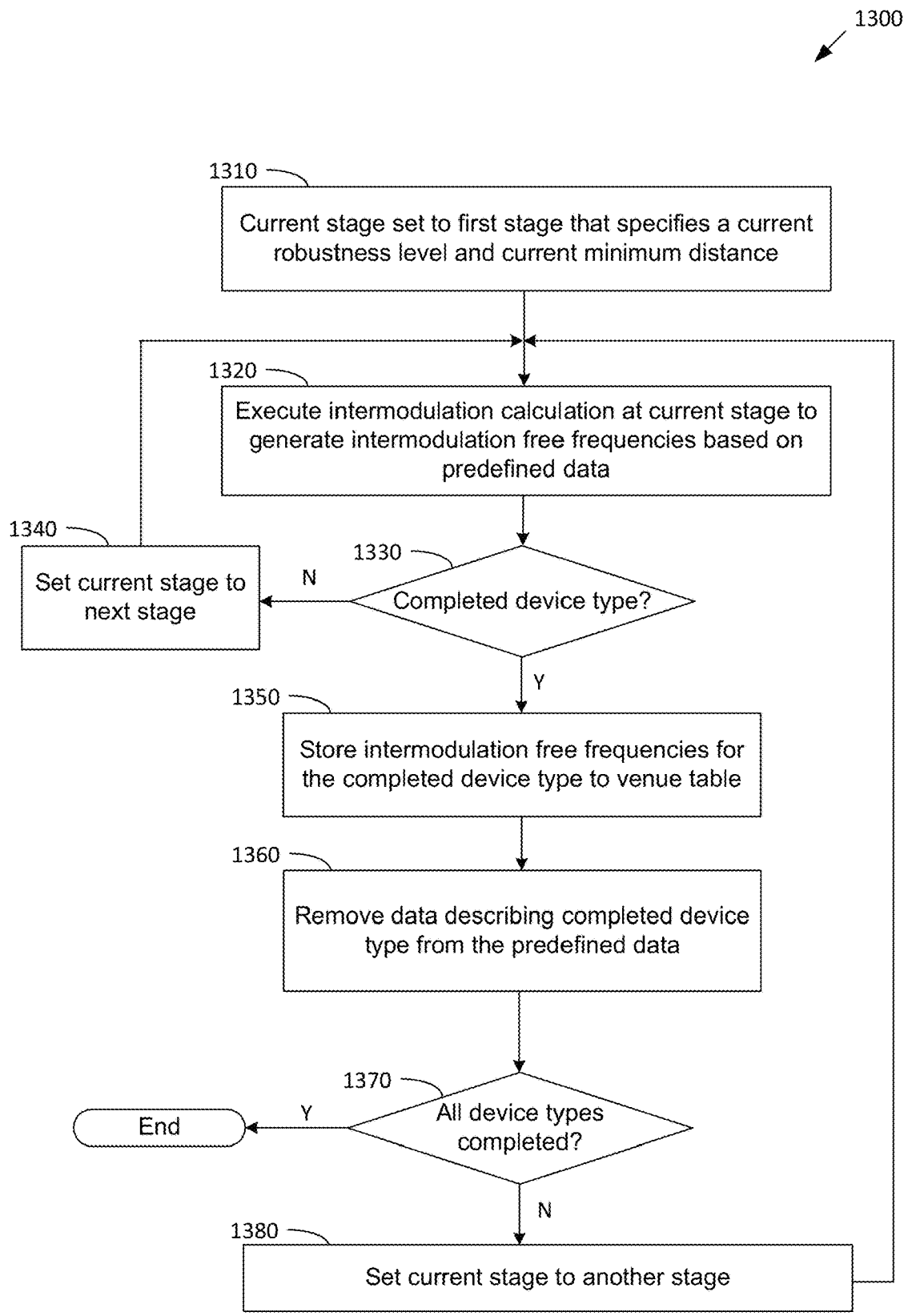
FIG. 13 illustrates a flow diagram of method steps for determining a set of intermodulation free frequencies for a venue, according to various embodiments.

FIG. 13 illustrates a flow diagram of method steps for determining a set of intermodulation free frequencies for a venue, according to various embodiments. Although the method steps are described in conjunction with the systems of FIGS. 1-3 and 5-11, persons skilled in the art will understand that the method steps can be performed in any order by any system. In some embodiments, the method 1300 is performed by the validation module 13 executing on the server 14. The method 1300 may comprise step 1240 of the method 1200 of FIGS. 12A-12B. Thus, the method 1300 may be performed by the server 14 to generate a set of intermodulation free frequencies for a WMS setup at a particular venue based on predefined data describing the WMS setup at the particular venue.

In general, the server 14 may determine the set of intermodulation free frequencies by performing a plurality of chained/linked stages of intermodulation calculations based on different robustness indexes for the different stages. Two or more stages may be chained/linked in the sense that some or all of an output of one stage may be used as input for another subsequent stage. Each stage in the plurality of stages may be associated with and defined by a different robustness index. For example, the plurality of stages may comprise five stages, whereby the first stage (S1) is associated with a first robustness index (Index1), the second stage (S2) is associated with a second robustness index (Index2), the third stage (S3) is associated with a third robustness index (Index3), the fourth stage (S4) is associated with a fourth robustness index (Index4), and the fifth stage (S5) is associated with a fifth robustness index (Index5). The first robustness index (Index1) may comprise the highest robustness level and the fifth robustness index (Index5) may comprise the lowest robustness level.

At each stage, a set of intermodulation free frequencies are determined based on the associated robustness index. In general, the robustness index indicates the level of audio quality for the resulting set of intermodulation free frequencies. A higher level of audio quality will have a lower probability of RF interference issues and intermodulation products. Thus, the set of intermodulation free frequencies generated at the first stage (S1) based on the first robustness index (Index1) will have the highest level of audio quality and the set of intermodulation free frequencies generated at the fifth stage (S5) based on the fifth robustness index (Index5) will have the lowest level of audio quality, relative to the other stages and robustness indexes. In particular, each robustness index may specify a particular minimum step/distance (in Hz) between each intermodulation free frequency in set of intermodulation free frequencies. The greater the robustness level, the higher the minimum separation/distance (in Hz) between each intermodulation free frequency will be. Thus, the first robustness index (Index1) will specify the highest minimum distance D1 between each intermodulation free frequency and the fifth robustness index (Index5) will specify the lowest minimum distance D5 between each intermodulation free frequency, relative to the other robustness indexes. For example, the first robustness index (Index1) will specify a minimum separation/distance D1 (such as 10 MHz), the second robustness index (Index2) will specify a minimum separation/distance D2 (such as 8 MHz), the third robustness index (Index3) will specify a minimum separation/distance D3 (such as 6 MHz), the fourth robustness index (Index4) will specify a minimum separation/distance D4 (such as 4 MHz), and the fifth robustness index (Index5) will specify a minimum distance D5 (such as 2 MHz) between each intermodulation free frequency.

The first robustness index (Index1) for the first stage (S1) specifies the highest robustness level. Thus, the set of intermodulation free frequencies generated at the first stage (S1) have the highest assurance of audio quality and the largest separation/distance between each intermodulation free frequency in the resulting set of intermodulation free frequencies, relative to the other stages and robustness indexes. However, the set of intermodulation free frequencies generated at the first stage (S1) will typically have the lowest number of total intermodulation free frequencies compared to the set of intermodulation free frequencies generated at other stages with lower robustness levels. In contrast, the fifth robustness index (Index5) for the fifth stage (S5) specifies the lowest robustness level. Thus, the set of intermodulation free frequencies generated at the fifth stage (S5) have the lowest assurance of audio quality and the smallest separation/distance between each intermodulation free frequency in the resulting set of intermodulation free frequencies, relative to the other stages and robustness indexes. However, the set of intermodulation free frequencies generated at the fifth stage (S5) will typically have the highest number of total intermodulation free frequencies compared to the set of intermodulation free frequencies generated at other stages with higher robustness levels.

In some embodiments, the predefined data specifies that the WMS setup at the venue comprises two or more different types of WMSs 15 configured to operate at different RF bands. For example, the predefined data may specify the WMS setup comprises 10 Device1-type WMSs configured to operate within band1, 10 Device2-type WMSs configured to operate within band2, and 5 Device3-type WMSs configured to operate within band3, for a total of 25 WMSs deployed at the WMS setup for the venue. Thus, the server 14 may determine to generate a total of 30 intermodulation free frequencies for the WMS setup at the venue, such as 12 intermodulation free frequencies for the Device1-type WMSs (comprising 10 assigned frequencies and 2 backup frequencies), 12 intermodulation free frequencies for the Device2-type WMSs (comprising 10 assigned frequencies and 2 backup frequencies), and 6 intermodulation free frequencies for the Device3-type WMSs (comprising 5 assigned frequencies and 1 backup frequency).

The method 1300 begins when a current stage is set (at step 1310) to equal the first stage (S1). The current stage specifies a current robustness level and a current minimum distance D1 between each intermodulation free frequency. In the first iteration of the method 1300, the current stage may be set to the first stage (S1) which corresponds to the highest robustness level (Index1) and the highest minimum distance D1 between each intermodulation free frequency.

The server 14 then executes (at step 1320) an intermodulation calculation algorithm at the current stage and current robustness level to generate a current set of intermodulation free frequencies based on the predefined data. Thus, the server 14 executes an intermodulation calculation algorithm to generate a set of intermodulation free frequencies based on the predefined data and the current minimum distance D between each intermodulation free frequency.

For example, the intermodulation calculation algorithm may determine a frequency array (list of frequencies) for intermodulation testing based on the predefined data. In general, the predefined data may exclude certain frequencies and frequency ranges from being included in the frequency array for intermodulation testing. For example, the predefined data may specify that the available frequency range allotted for the venue may comprise 500-900 Mhz. Thus, any frequencies outside the available frequency range will be excluded from the frequency array. For example, the predefined data may further specify that each WMS at the venue is configured to operate in a band such as 600-800 Mhz. Thus, any frequencies outside the band range will be further excluded from the frequency array. For example, the predefined data may further specify that a third party transmitter is operating at 650 Mhz. Thus, the 650 Mhz frequency will be further excluded from the frequency array.

The intermodulation calculation algorithm then selects a set of frequencies from the frequency array for intermodulation testing. For example, the venue may require 30 intermodulation free frequencies, whereby the intermodulation calculation algorithm selects a set of 30 different frequencies from the frequency array for modulation testing. The frequencies will be selected from the frequency array based on the robustness index/level and the corresponding minimum distance D between each intermodulation free frequency. For example, for the third robustness index at the third stage, the minimum distance may be 6 Mhz. Thus, the intermodulation calculation algorithm selects 30 frequencies from the frequency array having a minimum separation of 6 Mhz for modulation testing. However, if the robustness level and the minimum distance D is set too high, the intermodulation calculation algorithm may not be able to select enough frequencies from the frequency array that meet the requirements of the venue. The intermodulation calculation algorithm then tests the set of selected frequencies from the frequency array to determine if the set of selected frequencies comprise a set of intermodulation free frequencies. In particular, the intermodulation calculation algorithm may test the set of selected frequencies for the occurrence of intermodulation issues/products between the selected frequencies. For example, the intermodulation calculation algorithm may determine that only 15 of the selected frequencies do not incur intermodulation issues/products. Thus, the set of intermodulation free frequencies would comprise only the 15 selected frequencies.

The server 14 then determines (at step 1330) if the current set of intermodulation free frequencies completes/satisfies the total requirements of all WMSs of a same device type which operate in the same RF band (as described in the predefined data). For example, the current set of intermodulation free frequencies may comprise 8 intermodulation free frequencies for the Device1-type WMSs operating within band1, 5 intermodulation free frequencies for the Device2-type WMSs operating within band2, and 3 intermodulation free frequencies for the Device3-type WMSs operating within band3. Since there are 12 intermodulation free frequencies required for the Device1-type WMSs (comprising 10 assigned frequencies and 2 backup frequencies), 12 intermodulation free frequencies required for the Device2-type WMSs (comprising 10 assigned frequencies and 2 backup frequencies), and 6 intermodulation free frequencies required for the Device3-type WMSs (comprising 5 assigned frequencies and 1 backup frequency), the server 14 determines (at step 1330—No) that the current set of intermodulation free frequencies does not satisfy the total requirements of all WMSs of a same device type operating in a same RF band.

In response, the server 14 then sets (at step 1340) the current stage to the next stage in the plurality of stages. For example, in the second iteration of the method 1300, the current stage may be set to equal the second stage (S2) which corresponds to the second-highest robustness level (Index2) and the second-highest minimum distance D2 between each intermodulation free frequency. By continually moving to a next stage in the plurality of stages and lowering the robustness level, the method 1300 ensures that the set of intermodulation free frequencies determined for the next stage include a greater number of intermodulation free frequencies for satisfying the frequency requirements of the venue. The server 14 again executes (at step 1320) the intermodulation calculation algorithm at the current stage and current robustness level to generate a current set of intermodulation free frequencies based on the predefined data. Thus, the server 14 executes an intermodulation calculation algorithm to generate a set of intermodulation free frequencies based on the predefined data and the current minimum distance D between each intermodulation free frequency.

The server 14 again determines (at step 1330) if the current set of intermodulation free frequencies completes/satisfies the total requirements of all WMSs of a same device type which operate in the same RF band (as described in the predefined data). For example, the current set of intermodulation free frequencies may comprise 12 intermodulation free frequencies for the Device1-type WMSs operating within band1, 7 intermodulation free frequencies for the Device2-type WMSs operating within band2, and 4 intermodulation free frequencies for the Device3-type WMSs operating within band3. Since there are 12 intermodulation free frequencies required for the Device1-type WMSs (comprising 10 assigned frequencies and 2 backup frequencies), the server determines (at step 1330—Yes) that the current set of intermodulation free frequencies completes/satisfies the total requirements of all WMSs of the first device type (Device1), referred to herein as the "completed" device type.

In response, the server 14 stores (at 1350) the intermodulation free frequencies determined for the completed device type to the venue table 1175 associated with the venue. The server 14 then removes (at 1360) the data describing the WMSs of the completed device type from the predefined data. For example, the data describing the 10 Device1-type WMSs operating within band1 may be removed from the predefined data. The server 14 then determines (at step 1370) if the frequency requirements of all the device types specified in the predefined data are completed/satisfied. If so, this indicates that the intermodulation free frequencies for all WMS of all the device types have been determined (including the assigned frequencies and the backup frequencies) and the method 1300 ends. If not, the method 1300 proceeds to step 1380.

At step 1380, the server 14 sets (at step 1380) the current stage to another stage in the plurality of stages. For example, in the third iteration of the method 1300, the current stage may be set to equal the third stage (S3) which corresponds to the third-highest robustness level (Index3) and the third-highest minimum distance D3 between each intermodulation free frequency. In other embodiments, the server 14 may set (at step 1380) the current stage to a previous stage in the plurality of stages. For example, in the third iteration of the method 1300, the current stage may be set to equal the first stage (S1) again instead of the third stage (S1). Since the predefined data has changed (e.g., by removing the data describing the 10 Device1-type WMSs operating within band1), the intermodulation calculation algorithm performed at the first stage (S1) may thus produce a different set of intermodulation free frequencies than when previously performed using the original predefined data. Thus, if a higher level of robustness is desired, it may be worth the additional processing time to set the current stage to a previous stage, such as the first stage (S1). However, if a lower level of robustness is acceptable and a faster result is desired, the current stage may be set to a next stage in the plurality of stages, such as the third stage (S2). The method 1300 then proceeds to step 1320 and the server 14 again performs the intermodulation calculation algorithm at the current stage and current robustness level to generate a current set of intermodulation free frequencies based on the predefined data (which may be modified).

As shown above in steps 1350-1380, the method 1300 may use the output of one stage as the input to another stage. For example, the intermodulation calculations generated at the second stage produced the 12 intermodulation free frequencies required for the Device1-type WMSs, which were then stored to the venue table 1175. Therefore, the intermodulation free frequencies determined for a completed device type are fixed and cannot be changed by intermodulation calculations at other stages. Thus, the 12 intermodulation free frequencies generated at the second stage are preserved as input for the next stage of intermodulation calculations, whereby the next stage does not need to determine any intermodulation free frequencies for the Device1-type WMSs. The output of the second stage also includes the removal of the data describing the Device1-type WMSs from the predefined data. Thus, using the output of the second stage as an input (the 12 intermodulation free frequencies and the modified predefined data), the next stage of intermodulation calculations needs to only determine the intermodulation free frequencies for non-completed device types. For example, the next stage of intermodulation calculations needs to only determine the 12 intermodulation free frequencies for the Device2-type WMSs and the 6 intermodulation free frequencies for the Device3-type WMSs which remain as the non-completed device types.

In sum, a system and method is disclosed for determining assigned frequencies for wireless microphone systems (WMSs) at a venue. Each WMS comprises a transmitter and a receiver. Each transmitter may comprise an IoT device connected to the transmitters and a server via a network. A first input for requesting the assigned frequencies is received at a transmitter which sends the request to the server via the network. The server determines intermodulation free frequencies based on chained stages and predefined data describing the WMSs at the venue and transmits the intermodulation free frequencies to one or more transmitters at the venue. Each WMS receives an intermodulation free frequency as an assigned frequency. A second input for requesting validation of an assigned frequency is received at a transmitter which sends the request to the server. The server determines and sends a validation status of the assigned frequency to the transmitter which displays the validation status.

At least one technical advantage of the disclosed techniques relative to the prior art is that a cloud server automatically determines a set of assigned frequencies for a set of WMSs of a WMS setup upon receiving a user input at a transmitter (microphone) of any WMS included in the WMS setup. The server may automatically determine a set of intermodulation free frequencies for the set of assigned frequencies based on predefined data describing the WMS setup at a venue. The server may also dynamically re-determine the set of assigned frequencies for the WMS setup whenever receiving a request for the set of assigned frequencies from any transmitter of the WMS setup, for example, if intermodulation issues should arise before or during the performance at the venue. Thus, the disclosed techniques avoid the manual determination of the set of assigned frequencies for the WMS setup, which is time consuming and difficult.

Another technical advantage is the disclosed techniques allow a user of a particular WMS included in the WMS setup to easily validate an assigned frequency with the cloud server. When a transmitter of a particular WMS receives a user input requesting validation of the assigned frequency, the request is sent to the server which determines and sends a validation status of the assigned frequency to the transmitter. Another technical advantage is the disclosed techniques allow a user of a particular WMS included in the WMS setup to dynamically obtain a new assigned frequency from the cloud server. If an assigned frequency for a transmitter is determined by the server to be invalid, the server may send a new assigned frequency to the transmitter. These technical advantages represent one or more technological advancements over prior art approaches.

Aspects of the subject matter described herein are set out in the following numbered any of clauses.

1. In some embodiments, a computer-implemented method comprising receiving, at a first transmitter of a first wireless microphone system included in a plurality of wireless microphone systems, a first user request for a plurality of assigned frequencies for the plurality of wireless microphone systems; sending, to a server and via a network, a first request for the set of assigned frequencies; and receiving, from the server, the plurality of assigned frequencies, wherein the plurality of assigned frequencies comprise a plurality of intermodulation free frequencies.

2. The computer-implemented method of clause 1, further comprising configuring each wireless microphone system included in the plurality of wireless microphone systems to operate at a different assigned frequency in the plurality of assigned frequencies.

3. The computer-implemented method of any of clauses 1-2, wherein the first transmitter includes a smart controller module comprising at least one of an Internet of Things (IoT) module and a Bot module.

4. The computer-implemented method of any of clauses 1-3, wherein the plurality of assigned frequencies is determined based on predefined data that describes the plurality of wireless microphone systems.

5. The computer-implemented method of any of clauses 1-4, wherein the predefined data comprises at least one of hardware parameters, environment data, user input data, third party frequency data, and frequency set up data.

6. The computer-implemented method of any of clauses 1-5, wherein the plurality of assigned frequencies is determined by performing intermodulation calculations at each stage in a plurality of chained stages.

7. The computer-implemented method of any of clauses 1-6, wherein each stage in the plurality of chained stages is associated with a different minimum separation between the frequencies included in the plurality of assigned frequencies.

8. The computer-implemented method of any of clauses 1-7, further comprising: receiving, at the first transmitter of the first wireless microphone system, a second user request a validation of a first assigned frequency for the first wireless microphone system; and sending the first assigned frequency and a second request, via the network, to the server for validating the first assigned frequency.

9. The computer-implemented method of any of clauses 1-8, further comprising: receiving, from the server and via the network, a validation status for the first assigned frequency; and displaying, at the first transmitter of the first wireless microphone system, an indicator that indicates the validation status for the first assigned frequency.

10. In some embodiments, a wireless microphone system comprising: a first transmitter configured for: receiving, at a first transmitter of a first wireless microphone system included in a plurality of wireless microphone systems, a first user request for a plurality of assigned frequencies for the plurality of wireless microphone systems; sending, to a server and via a network, a first request for the set of assigned frequencies; and receiving, from the server, the plurality of assigned frequencies, wherein the plurality of assigned frequencies comprise a plurality of intermodulation free frequencies; and a first receiver configured for communicating with the first transmitter.

11. The wireless microphone system of clause 10, wherein the first transmitter is further configured for distributing the plurality of assigned frequencies to the plurality of wireless microphone systems via the network.

12. The wireless microphone system of any of clauses 10-11, wherein each wireless microphone system in the plurality of wireless microphone systems comprises a transmitter and a receiver configured to communicate via the assigned frequency.

13. The wireless microphone system of any of clauses 10-12, wherein the first transmitter includes a smart controller module comprising at least one of an Internet of Things (IoT) module and a Bot module.

14. The wireless microphone system of any of clauses 10-13, wherein the plurality of assigned frequencies is determined based on predefined data that describes the plurality of wireless microphone systems.

15. The wireless microphone system of any of clauses 10-14, wherein the predefined data comprises at least one of hardware parameters, environment data, user input data, third party frequency data, and frequency set up data.

16. The wireless microphone system of any of clauses 10-15, wherein the plurality of assigned frequencies is determined by performing intermodulation calculations at each stage in a plurality of chained stages.

17. The wireless microphone system of any of clauses 10-16, wherein each stage in the plurality of chained stages is associated with a different robustness level that indicates a different level of audio quality for the plurality of assigned frequencies.

18. The wireless microphone system of any of clauses 10-17, wherein the first transmitter is further configured for: receiving a second user request for validating a first assigned frequency for the first wireless microphone system; and sending the first assigned frequency and a second request to the server for validating the first assigned frequency.

19. The wireless microphone system of any of clauses 10-18, wherein the first transmitter is further configured for: receiving from the server, via the network, a validation status for the first assigned frequency; and displaying an indicator that indicates the validation status for the first assigned frequency.

20. In some embodiments, one or more non-transitory computer-readable media comprising instructions that, when executed by one or more processors, cause the one or more processors to perform the steps of: receiving, at a first transmitter of a first wireless microphone system included in a plurality of wireless microphone systems, a first user request for a plurality of assigned frequencies for the plurality of wireless microphone systems; sending, to a server and via a network, a first request for the set of assigned frequencies; and receiving, from the server, the plurality of assigned frequencies, wherein the plurality of assigned frequencies comprise a plurality of intermodulation free frequencies determined based on predefined data that describes the plurality of wireless microphone systems.

Any and all combinations of any of the claim elements recited in any of the claims and/or any elements described in this application, in any fashion, fall within the contemplated scope of the present embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Generally, a "module" constitutes a software application, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like. Note that the term module may refer to a collection of routines and data structures that perform a particular task or implements a particular abstract data type.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
receiving, at a first transmitter of a first wireless microphone system included in a plurality of wireless microphone systems, a first user request for a set of assigned frequencies for the plurality of wireless microphone systems;
sending, to a server via a network, a first request for the set of assigned frequencies; and
receiving, by the first transmitter from the server, the set of assigned frequencies, wherein the set of assigned frequencies comprises a plurality of intermodulation free frequencies.

2. The computer-implemented method of claim 1, further comprising configuring each wireless microphone system included in the plurality of wireless microphone systems to operate at a different assigned frequency in the set of assigned frequencies.

3. The computer-implemented method of claim 1, wherein the first transmitter includes a smart controller module comprising at least one of an Internet of Things (IoT) module or a Bot module.

4. The computer-implemented method of claim 1, wherein the set of assigned frequencies is determined based on predefined data that describes the plurality of wireless microphone systems.

5. The computer-implemented method of claim 4, wherein the predefined data comprises at least one of hardware parameters, environment data, user input data, third party frequency data, or frequency set up data.

6. The computer-implemented method of claim 1, wherein the set of assigned frequencies is determined by performing intermodulation calculations at each stage in a plurality of chained stages.

7. The computer-implemented method of claim 6, wherein each stage in the plurality of chained stages is associated with a different minimum separation between frequencies included in the set of assigned frequencies.

8. The computer-implemented method of claim 1, further comprising:
receiving, at the first transmitter of the first wireless microphone system, a second user request for validation of a first assigned frequency for the first wireless microphone system; and
sending the first assigned frequency and a second request, via the network, to the server for validating the first assigned frequency.

9. The computer-implemented method of claim 8, further comprising:
receiving, from the server via the network, a validation status for the first assigned frequency; and
displaying, at the first transmitter of the first wireless microphone system, an indicator that indicates the validation status for the first assigned frequency.

10. A system comprising:
a first transmitter of a first wireless microphone system included in a plurality of wireless microphone systems, the first transmitter being configured for:
receiving a first user request for a set of assigned frequencies for the plurality of wireless microphone systems;
sending, to a server via a network, a first request for the set of assigned frequencies; and
receiving, from the server, the set of assigned frequencies, wherein the set of assigned frequencies comprise a plurality of intermodulation free frequencies; and
a first receiver of a second wireless microphone system included in the plurality of wireless microphone systems, the first receiver being configured for communicating with the first transmitter using a first assigned frequency in the set of assigned frequencies.

11. The system of claim 10, wherein the first transmitter is further configured for distributing the set of assigned frequencies to the plurality of wireless microphone systems via the network.

12. The system of claim 11, wherein each wireless microphone system in the plurality of wireless microphone systems comprises a transmitter and a receiver configured to communicate via one of the assigned frequencies.

13. The system of claim 10, wherein the first transmitter includes a smart controller module comprising at least one of an Internet of Things (IoT) module or a Bot module.

14. The system of claim 10, wherein the set of assigned frequencies is determined based on predefined data that describes the plurality of wireless microphone systems.

15. The system of claim 14, wherein the predefined data comprises at least one of hardware parameters, environment data, user input data, third party frequency data, or frequency set up data.

16. The system of claim 10, wherein the set of assigned frequencies is determined by performing intermodulation calculations at each stage in a plurality of chained stages.

17. The system of claim 16, wherein each stage in the plurality of chained stages is associated with a different robustness level that indicates a different level of audio quality for the set of assigned frequencies.

18. The system of claim 10, wherein the first transmitter is further configured for:

receiving a second user request for validating the first assigned frequency; and sending the first assigned frequency and a second request to the server for validating the first assigned frequency.

19. The system of claim 18, wherein the first transmitter is further configured for:

receiving from the server, via the network, a validation status for the first assigned frequency; and displaying an indicator that indicates the validation status for the first assigned frequency.

20. One or more non-transitory computer-readable media comprising instructions that, when executed by one or more processors, cause the one or more processors to perform the steps of:

receiving, at a first transmitter of a first wireless microphone system included in a plurality of wireless microphone systems, a first user request for a set of assigned frequencies for the plurality of wireless microphone systems;

sending, to a server via a network, a first request for the set of assigned frequencies; and receiving, by the first transmitter from the server, the set of assigned frequencies, wherein the set of assigned frequencies comprise a plurality of intermodulation free frequencies determined based on predefined data that describes the plurality of wireless microphone systems.

* * * * *